(12) United States Patent
Liberman et al.

(10) Patent No.: US 8,345,364 B2
(45) Date of Patent: Jan. 1, 2013

(54) OPTICAL LIMITING USING PLASMONICALLY ENHANCING NANOPARTICLES

(75) Inventors: Vladimir Liberman, Reading, MA (US); Mordechai Rothschild, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 669 days.

(21) Appl. No.: 12/586,971

(22) Filed: Sep. 30, 2009

(65) Prior Publication Data

US 2011/0075263 A1 Mar. 31, 2011

(51) Int. Cl.
*G02B 5/22* (2006.01)
*B82Y 20/00* (2011.01)

(52) U.S. Cl. .................. 359/888; 977/810; 977/834
(58) Field of Classification Search .......... 359/885, 359/888; 977/810, 834
See application file for complete search history.

(56) References Cited

U.S. PATENT DOCUMENTS

| | | | | | |
|---|---|---|---|---|---|
| 4,093,353 | A | * | 6/1978 | Lang | 359/243 |
| 5,252,256 | A | * | 10/1993 | Tutt et al. | 252/582 |
| 5,280,169 | A | * | 1/1994 | Honey et al. | 250/216 |
| 5,741,442 | A | * | 4/1998 | McBranch et al. | 252/582 |
| 5,805,326 | A | * | 9/1998 | Snow et al. | 359/241 |
| 6,134,045 | A | * | 10/2000 | Jiang et al. | 359/321 |
| 6,297,918 | B1 | * | 10/2001 | Justus et al. | 359/886 |
| 6,384,960 | B1 | * | 5/2002 | Andrieux et al. | 359/299 |
| 6,556,336 | B2 | * | 4/2003 | Hutcheson et al. | 359/241 |
| 6,620,863 | B1 | * | 9/2003 | McLean et al. | 523/456 |
| 6,738,203 | B2 | * | 5/2004 | Ando et al. | 359/885 |
| 6,936,721 | B2 | * | 8/2005 | Parola et al. | 549/3 |
| 2008/0225422 | A1 | * | 9/2008 | Redert et al. | 359/885 |
| 2008/0279231 | A1 | * | 11/2008 | Farber et al. | 372/21 |
| 2009/0141343 | A1 | * | 6/2009 | Leard | 359/359 |
| 2010/0142056 | A1 | * | 6/2010 | Baek et al. | 359/614 |
| 2010/0142069 | A1 | * | 6/2010 | Nakamura et al. | 359/885 |
| 2010/0177518 | A1 | * | 7/2010 | Walls et al. | 362/293 |
| 2011/0075263 | A1 | * | 3/2011 | Liberman et al. | 359/614 |

(Continued)

FOREIGN PATENT DOCUMENTS

WO WO 2010129196 A2 * 11/2010

(Continued)

OTHER PUBLICATIONS

Wang, J. and Blau, W. J., Inorganic and hybrid nanostructures for optical limiting, Journal of Optics A: Pure and Applied Optics, vol. 11, (Jan. 14, 2009), pp. 1-16.*

(Continued)

*Primary Examiner* — Mark Consilvio
(74) *Attorney, Agent, or Firm* — Hamilton, Brook, Smith & Reynolds, P.C.

(57) ABSTRACT

There is provided an optical limiter device for protecting an object from incident light having a wavelength in the visible, infrared or ultraviolet spectrum. The device comprises a plurality of nanoparticles of a metallic material including free electrons that undergo collective oscillations when exposed to the incident light. The plurality of nanoparticles of the metallic material include a plurality of nanoparticles of a non-spherical particle geometry, which may include a geometry having a plurality of sharp protrusions on a spherical body. The metallic material may include gold, silver, aluminum, indium or copper. The device further comprises a structurally rigid transparent medium in which the plurality of nanoparticles of the metallic material are embedded; and a mechanical support mounting the transparent medium between the incident light and the object.

47 Claims, 14 Drawing Sheets
(2 of 14 Drawing Sheet(s) Filed in Color)

U.S. PATENT DOCUMENTS

2011/0170208 A1* 7/2011 Zhao et al. ............... 359/886
2011/0304934 A1* 12/2011 Zhao et al. ............... 359/886

FOREIGN PATENT DOCUMENTS

WO  WO 2011081605 A1 * 7/2011

OTHER PUBLICATIONS

Porel, S. et al., Nanoparticle-Embedded Polymer: In Situ Synthesis, Free-Standing Films with Highly Monodisperse Silver Nanoparticles and Optical Limiting, Chem. Mater., vol. 17 (2005), pp. 9-12.*

West, R. et al., Nonlinear Absorption Properties in Novel Gold Nanostructured Topologies, Journal of Physical Chemistry B, vol. 107, (2003), pp. 3419-3426.*

Prem Kiran, P. et al., Nonlinear optical properties and surface-plasmon enhanced optical limiting in Ag-Cu nanoclusters co-doped in SiO2 Sol-Gel films, Journal of Applied Physics, vol. 96, No. 11, (Dec. 1, 2004), pp. 6717-6723.*

Philip, R. et al., Picosecond optical nonlinearity in monolayer-protected gold, silver, and gold-silver alloy nanoclusters, Physical Review B, vol. 62, No. 19 (Nov. 15, 2000), pp. 13,161-13,166.*

Qu, Shiliang et al., Nonlinear Absorption and Optical Limiting Properties in Sol-Gel Solidified Gold Nanorods, Proc. of SPIE vol. 5061, (2003) pp. 222-226.*

Bakr, O.M., et al., "High-Yield Synthesis of Multi-Branched Urchin-Like Gold Nanoparticles," *Chem. Mater.*, 18: 3297-3301 (2006).

Beversluis, M.R., et al., "Continuum generation from single gold nanostructures through near-field mediated intraband transitions," *Physical Review B*, 68: 115433-1-115433-10 (Sep. 2003).

Calvete, M., et al., "Porphyrins and phthalocyanines as materials for optical limiting," *Synthetic Metals*,141: 231-243 (2004).

Chapple, P.B., et al., "Single-Beam Z-Scan: Measurement Techniques and Analysis," *Journal of Nonlinear Optical Physics and Materials*, 6(3): 251-293 (1997).

Elim, H.I., et al., "Observation of saturable and reverse-saturable absorption at longitudinal surface plasmon resonance in gold nanorods," *Applied Physics Letters*, 88: 083107-1-083107-3 (2006).

Fort, E., and Grésillon, S., "Surface-enhanced fluorescence," *J. Phys. D: Appl. Phys.*, 41 013001, 31 pp. (2008). Retrieved on Aug. 6, 2011 from the Internet URL: http://iopscience.iop.org/0022-3727/41/1/013001.

François, L., et al., "Optical limitation induced by gold clusters: Mechanism and efficiency," *Phys. Chem. Chem. Phys.*, 3: 4965-4971 (2001).

Hildebrandt, P. and Stockburger, M., "Surface-Enhanced Resonance Raman Spectroscopy of Rhodamine 6G Adsorbed on Colloidal Silver," *J. Phys. Chem.*, 88: 5935-5944 (1984).

Hodak, J., et al., "Ultrafast study of electron-phonon coupling in colloidal gold particles," *Chemical Physics Letters*, 284: 135-141 (1998).

Martin, R.B., et al., "Optical limiting of silver-containing nanoparticles," *Optical Materials*, 29: 788-793 (2009).

Martin, R.B., et al., "Superior optical limiting performance of simple metalloporphyrin derivatives," *Optical Materials*. 27: 1340-1345 (2005).

Miller, M.J., et al., "General Optical Limiting Requirements," *SPIE*, 3472: 24-29 (Jul. 1998).

Moskovits, M., "Surface-enhanced Raman spectroscopy: a brief retrospective," *Journal of Raman Spectroscopy*, 36: 485-496 (2005).

Panoiu, N.C. and Osgood, Jr., R.M., "Linear and Nonlinear Transmission of Surface Plasmon Polaritons in an Opitcal Nanowire," *Mater. Res. Soc. Symp. Proc.*, 836: DD5.6.1-DD5.6.6 (2005).

Qiang, R., et al., "Modeling Electrical Properties of Gold Films at Infrared Frequency Using FDTD Method," *International Journal of Infrared and Millimeter Waves*, 25(8): 1263-1270 (Aug. 2004).

Qu, S., et al., "Optical nonlinearities from transverse plasmon resonance in gold nano-rods," *Materials Letters*, 58: 1427-1430 (2004).

Rakić, A.D., et al., "Optical properties of metallic films for vertical-cavity optoelectronic devices," *Applied Optics*, 37(22): 5271-5283 (Aug. 1998).

Schuck, P.J., et al., "Improving the Mismatch between Light and Nanoscale Objects with Gold Bowtie Nanoantermas," *Physical Review Letters*, 94: 017402-1-017402-4 (Jan. 2005).

Sheik-bahae, M., et al., "High-sensitivity, single-beam $n_2$ measurements," *Optics Letters*, 14(17): 955-957 (Sep. 1989).

Sun, Y-P, et al., "Strong Optical Limiting of Silver-Containing Nanocrystalline Particles in Stable Suspensions," *J. Phys. Chem. B*, 103: 77-82 (1999).

Taflove, A., et al., *Computational Electromagnetics: The Finite-Difference Time-Domain Method*, (Academic Press) pp. 629-670 (2005).

Wang, G. and Sun, W., "Optical Limiting of Gold Nanoparticle Aggregates induced by Electrolytes," *J. Phys. Chem B.*, 110: 20901-20905 (2006).

Wang, J. and Blau, W.J., "Inorganic and hybrid nanostructures for optical limiting," *J. Opt. A: Pure All. Opt.*, 11 024001: 1-16. (2009). Retrieved on Aug. 6, 2011 from the Internet URL: http://iopscience.iop.org/1464-4258/11/2/024001.

Wang, J. and Blau, W.J., "Nonlinear optical and optical limiting properties of individual single-walled carbon nanotubes," *Appl. Phys. B*, 91: 521-524 (2008).

Yguerabide, J., and Yguerabide, E.E., "Light-Scattering Submicroscopic Particles as Hihgly Fluorescent Analogs and Their Use as Tracer Labels in Clinical and Biological Applications," *Analytical Biochemistry*, 262: 157-176 (1998).

Zeman, E.J. and Schatz, G.C., "An Accurate Electromagnetic Theory Study of Surface Enhancement Factors for Ag, Au, Cu, Li, Na, Al, Ga, In, Zn, and Cd," *J. Phys. Chem*, 91: 634-643 (1987).

* cited by examiner

Exposing device to incident light enhances local electric field inside non-spherical nanoparticles to absorb energy of incident light above threshold intensity, thereby preventing transmission

1401

Exposing device to incident light of intensity not exceeding the threshold intensity, thereby transmitting the incident light below the threshold intensity

OPTICAL LIMITING USING PLASMONICALLY ENHANCING NANOPARTICLES

GOVERNMENT SUPPORT

The invention was supported, in whole or in part, under United States Air Force contract number FA8721-05-C-0002, program number 1-9442. The Government has certain rights in the invention.

BACKGROUND OF THE INVENTION

Since the invention of laser irradiation, there has been a need for the protection of photosensitive objects from the intense light generated by lasers. Laser exposure may either be accidental, such as that from a portable range-finding device, or it may be deliberate, such as that from a hostile action. The protection is required for human eyes as well as for sensitive optical equipment, such as specialized cameras. In the case of eye protection, the maximum allowable energy or power incident on the eye has been quantified by the American National Standard for Safe Use of Lasers (Laser Institute of America, ANSI Z136.1-2007), and it depends on the laser wavelength and pulse duration. For example, for lasers in the visible (400-700 nm) and pulses of 1 ns to 18 μs, the maximum exposure is 0.5 μJ/cm$^2$. Herein, references to "eye protection" may also refer to "equipment protection," unless otherwise specified.

There are several approaches to designing eye protection devices. One possibility is a non-varying device that always blocks radiation, such as dark sunglasses. However, in order for such sunglasses to provide adequate blocking of intense radiation, they would have to be too opaque to be useful to the wearer. Another possibility for non-varying eye protection is to block only a narrow wavelength band of radiation, which would correspond to the incident laser wavelength. Narrow-band blocking is accomplished by applying an optical interference filter, comprised of multiple thin films whose thicknesses and refractive indices are selected appropriately. This approach would succeed only if the incident laser wavelength is known, which is not always the case, and only over a narrow range of incident angles.

A better approach than a non-varying optical filter is a device that decreases its transmission in response to changes in the intensity of the incoming radiation. Such devices are termed "optical limiters," because at low incident light intensities they are transparent, while as the intensity increases, they become progressively more opaque, so that the transmitted light intensity is "limited" to a certain level. Ideally, optical limiters should satisfy several requirements: first and foremost is sensitivity, i.e., their transition from transparency to opaqueness should occur at eye-safe incident intensities. Next, their dynamic range should be high enough that the transmitted intensity is "clamped" at eye-safe levels even when the incident intensity varies by orders of magnitude. Third, for many applications optical limiters should have a fast response time, on the scale of nanoseconds or less. Fourth, they should recover their transparency quickly, if not quite on the nanosecond scale, after the threat is over. Other ideal requirements are insensitivity to the polarization of incident light, a wide acceptance angle, simplicity, environment stability, and so on. Several optical limiting material systems have been investigated in the past. In particular, the requirements of fast response and recovery times have led researchers to explore multiphoton electronic transitions in molecules, such as efficient two-photon absorption in the visible, especially if the excited state absorption coefficient is unusually high. A number of organic compounds with such properties have indeed been identified, e.g., porphyrins and phthalocyanines. However, these molecules are often environmentally unstable, or they can be damaged by very high laser intensities. Even more importantly, according to published papers the incident intensities required to induce changes in transmission are still several orders of magnitude too high (10-100 mJ/cm$^2$), even in the most sensitive optical limiters.

In addition to organic molecules as optical limiters, there have been a few reports indicating that inorganic nanoparticles can also exhibit optical limiting behavior, especially nanoparticles of gold or silver. Unlike in the organic molecules, in the case of inorganic nanoparticles the underlying mechanism for the optical limiting behavior is not well understood, but at least in one publication it has been ascribed to two-photon absorption by the surface plasmons. Prior investigations have studied spherical nanoparticles, randomly distributed in liquid suspension. Until now nanoparticles have not been considered as serious alternatives to organic molecule limiters, because their reported photosensitivity has been no better, and often worse than that of the organic optical limiters: 100-1000 mJ/cm$^2$ have been required to induce a significant increase in absorption.

SUMMARY OF THE INVENTION

In accordance with an embodiment of the invention, there is provided an optical limiter device for protecting an object from incident light having a wavelength in the visible, infrared or ultraviolet spectrum. The device comprises a plurality of nanoparticles of a metallic material including free electrons that undergo collective oscillations when exposed to the incident light. The plurality of nanoparticles of the metallic material include a plurality of nanoparticles of a non-spherical particle geometry. The device further comprises a structurally rigid transparent medium in which the plurality of nanoparticles of the metallic material are embedded; and a mechanical support mounting the transparent medium between the incident light and the object.

In further, related embodiments the non-spherical particle geometry may include a geometry having a plurality of sharp protrusions on a spherical body. The metallic material may include gold or silver; and may include at least one material selected from the group consisting of gold, silver, aluminum, indium and copper. Each nanoparticle of the plurality of nanoparticles may have a largest diameter of greater than 10 nanometers and less than 200 nanometers. The non-spherical particle geometry may include a geometry that includes at least one corner; may have a geometry selected from the group consisting of a cube geometry, a pyramid geometry and a polyhedron geometry; or may include a mushroom-shaped geometry. The object may be selected from the group consisting of a human eye, a photosensitive device, a camera, a detector, a portion of a vehicle, a portion of an airborne system, a portion of an airplane, a portion of a helicopter, a portion of a space-borne system, a portion of a rocket, a portion of a missile, a portion of a telescope and a portion of a satellite. The incident light may include light from a laser.

In further embodiments, the device may include an alloy including at least one material selected from the group consisting of silver, gold, aluminum, indium and copper. The transparent medium may include a material selected from the group consisting of a polymer and a glass. The plurality of nanoparticles may include at least two different types of nanoparticles. The device may include a patterning of at least two different types of nanoparticles; and may include a pixel array comprising at least two different types of nanoparticles. The device may be sufficiently robust to be used more than once to protect the object from the incident light.

In another embodiment according to the invention, there is provided a method of protecting an object from incident light. The method comprises the step of exposing a device, positioned between the incident light and the object, to incident light of a wavelength in the visible, infrared or ultraviolet spectrum and of an intensity exceeding a threshold intensity, thereby at least substantially preventing transmission of the incident light above the threshold intensity through the device to the object. The device includes a plurality of nanoparticles of a metallic material including free electrons that undergo collective oscillations when exposed to the incident light at the wavelength in the visible, infrared or ultraviolet spectrum. The plurality of nanoparticles of the metallic material includes a plurality of nanoparticles of a non-spherical particle geometry. The plurality of nanoparticles of the metallic material are embedded in a structurally rigid transparent medium. The device is exposed to the incident light to thereby enhance a local electric field inside the surfaces of the plurality of nanoparticles of the non-spherical particle geometry to cause the plurality of nanoparticles of the non-spherical particle geometry to absorb the energy of the incident light above the threshold intensity and thereby at least substantially prevent transmission of the incident light above the threshold intensity through the device to the object. The method further comprises the step of exposing the device to incident light of an intensity not exceeding the threshold intensity, thereby at least substantially transmitting the incident light below the threshold intensity through the device to the object.

In further, related embodiments, the method may further comprise the step of exposing the device to the incident light when an intensity of the incident light is below the threshold intensity, thereby at least substantially transmitting the incident light below the threshold intensity through the device to the object. Subsequently the device is exposed to the incident light after the incident light transitions in intensity from below the threshold intensity to exceeding the threshold intensity, thereby at least substantially preventing transmission of the incident light above the threshold intensity through the device to the object for as long as the incident light exceeds the threshold intensity. The method further comprises subsequently resuming exposing the device to the incident light after the incident light transitions in intensity from exceeding the threshold intensity to being below the threshold intensity, thereby resuming at least substantially transmitting the incident light below the threshold intensity through the device to the object.

In further, related embodiments, the transmission of the incident light above the threshold intensity through the device to the object may essentially cease within a time of less than one nanosecond after the incident light transitions in intensity from below the threshold intensity to exceeding the threshold intensity. The threshold intensity may be $0.5\ \mu J/cm^2$ or less for a pulse lasting one millisecond or less. Transmission of the incident light above the threshold intensity through the device to the object may essentially cease at any wavelength of incident light within at least a broadband range of the visible, infrared or ultraviolet spectrum. The broadband range may include a range of incident light wavelengths that overlaps at least a portion of the range from 450 nm to 650 nm. The method may include, more than once, exposing the device to the incident light to thereby at least substantially prevent transmission of the incident light above the threshold intensity through the device to the object. The transmission of the incident light above the threshold intensity through the device to the object may be at least substantially reduced over at least a broad range of angles of incidence and over at least a broad range of polarizations of incident light.

An embodiment according to the invention is of utility in protecting an object from incident light having a wavelength in the visible, infrared or ultraviolet spectrum. For example, the incident light may have an intensity exceeding a threshold intensity; and an embodiment according to the invention finds utility in at least substantially preventing transmission of the incident light when its intensity is above the threshold intensity while at least substantially transmitting the incident light when its intensity is below the threshold intensity. An embodiment according to the invention provides advantages over non-varying optical protection devices by adequately blocking intense radiation, but without being opaque during normal use. Further, an embodiment according to the invention provides advantages over narrowband devices by providing protection over a broad range of incident wavelengths and incident angles. Further, an embodiment according to the invention provides advantages of sensitivity, i.e., their transition from transparency to opaqueness may occur at eye-safe or equipment-safe incident intensities; advantages in having a high enough dynamic range that the transmitted intensity is "clamped" at eye-safe or equipment-safe levels even when the incident intensity varies by orders of magnitude; advantages in having a fast response time, on the scale of nanoseconds or less; and advantages in recovering their transparency quickly after the threat is over. Further, an embodiment according to the invention provides the advantages of insensitivity to the polarization of incident light, a wide acceptance angle, simplicity, environment stability, and the ability not to be damaged by high laser intensities.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The patent or application file contains at least one drawing executed in color. Copies of this patent or patent application publication with color drawing(s) will be provided by the Office upon request and payment of the necessary fee.

FIGS. 7A-7C illustrate a method for decomposing a nanourchin into a simulation geometry having a main spherical body and a set of ellipsoid spines, in which FIG. 7A is a transmission electron micrograph of the nanourchin, FIG. 7B is an XZ plane slice through the center of the structure, and FIG. 7C is a corresponding simulated three-dimensional shape, for a nanourchin in accordance with an embodiment of the invention;

FIG. 14 is a block diagram of a method of protecting an object from incident light, in accordance with an embodiment of the invention.

DETAILED DESCRIPTION OF THE INVENTION

Figure 1:
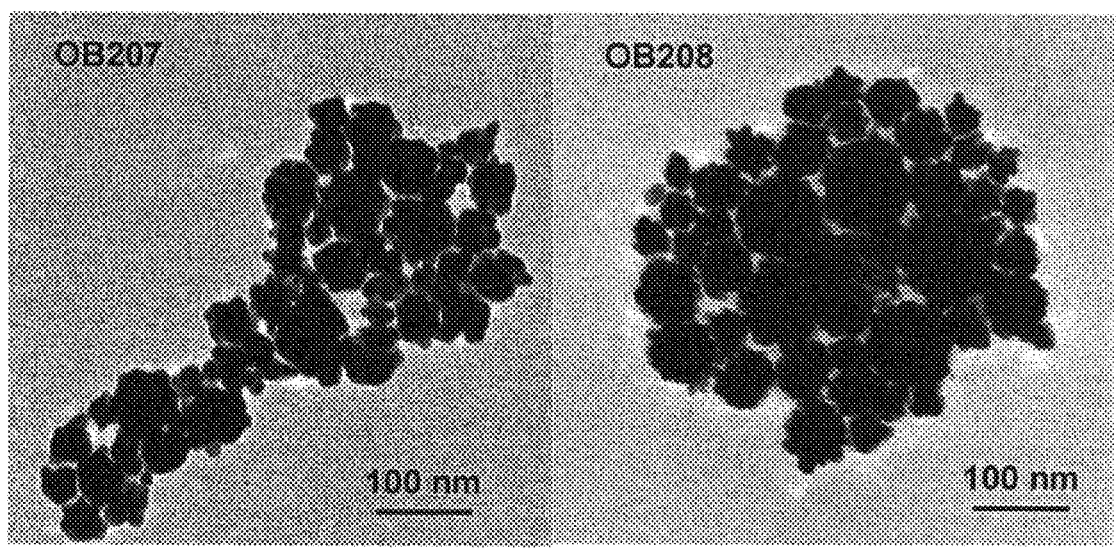
FIG. 1 shows transmission electron micrographs of two gold nanourchin samples analyzed in an experiment carried out in accordance with an embodiment of the invention.

A description of example embodiments of the invention follows.

Protecting eyes and sensitive devices from damage by high-power lasers continues to be the subject of active studies. One approach involves materials that exhibit optical limiting, i.e., that are nearly transparent at low intensities but at high intensities transmit a maximum (safe) amount of radiation independent of the incident intensity. The maximum allowable amount of irradiation depends on a number of factors, such as laser pulse duration, laser wavelength and the type of protected sensor. For instance, in the visible wavelength range, where the human eye is the primary sensor, the permissible amount of radiation is related to the Maximum Permissible Exposure (MPE) level, which is 0.5 $\mu J/cm^2$ for sub-ms pulses. Since this is a very low value, it has been suggested that for high incident energy laser pulses, even a goal that is within a factor of five to ten times higher than the MPE would be an aggressive value.

Optical limiting behavior depends on nonlinear absorption in the target medium. In the visible spectral range such absorption usually involves transitions between electronic states, which can be extremely rapid, thus providing the sub-ns response time required to protect against pulsed lasers. Candidate materials for optical limiting have included organic molecules such as phthalocyanines and porphyrins, carbon nanotubes, and inorganic nanoparticles. While the best systems show optical limiting "clamping" performance at the 50 $mJ/cm^2$/pulse level, the results are still orders of magnitude away from the targets mentioned above. Furthermore, the demonstrated performance is often wavelength-specific, and does not cover the desired broad spectral range.

Silver and gold nanoparticles and clusters represent a subclass of materials that have been observed to exhibit optical limiting behavior. The lowest "clamping fluence" for these systems, on the order of 150 $mJ/cm^2$/pulse, has been observed with silver (Ag) nanoparticle-based suspensions. The phenomenology is still poorly understood, in part because most cited reports were performed at a fixed wavelength (532 nm), usually at very high intensities which can cause multiple nonlinear effects. Even for the ns-pulse regime, the specifics of the process are uncertain, and several mechanisms have been invoked in the literature, including free carrier absorption, surface plasmon absorption as well as plasmon-induced nonlinear scattering.

Silver and gold nanoparticle structures are known for their electric-field-based enhancement of optical phenomena, such as Raman scattering of adsorbates and fluorescence. Within the context of surface enhanced Raman scattering (SERS), early numerical simulations of electric-field enhancement estimate that Ag spheres are about five times more efficient than gold (Au) spheres and that shape-optimized (elongated) nanoparticles are greater than ten times more efficient than their spherical counterparts. One study showed that electrolyte-induced aggregation of Au nanoparticles into clusters significantly enhanced optical limiting. This effect parallels work on SERS where electrolyte-induced nanoparticle aggregation has been directly connected to plasmonic enhancement of the Raman signal.

However, to date few researchers have directly explored the potential connection between plasmonic enhancement and optical limiting.

In accordance with an embodiment of the invention, nanostructures that are optimized for nonlinear electric near-field enhancement are designed and characterized experimentally as well as computationally. By analyzing nanostructures with various degrees of enhancement over a broad wavelength range, it has been found in accordance with an embodiment of the invention that the observed optical limiting effect scales with the plasmonic enhancement of the nanomaterial. Proper optimization of surface plasmon resonance leads to a rational design of nanostructures optimized for optical limiting.

In accordance with an embodiment of the invention, optical limiting by suspensions of Au nanoparticles is enhanced by several orders of magnitude with the use of complex plasmonic shapes, such as spined "nanourchins," instead of nanospheres. Here, a "nanourchin" is a nanostructure that includes a main spherical body and multiple protruding spine-like structures. Experiments, performed with a Z-scan technique over a wavelength range from 450 to 650 nm and a 7-ns pulsed laser, are analyzed herein in terms of an effective "two-photon" absorption coefficient, which depends nonlinearly on the local, plasmonically enhanced electric field. FDTD simulations reveal a large electric field enhancement inside the nano-spined structures and qualitatively confirm the plasmonic trends, where Ag nanospheres and Au nanourchins are more effective than Au nanospheres. Designing nanostructures for the maximum plasmonic enhancement provides a roadmap to materials and geometries with optimized optical limiting behavior.

A description of experiments carried out in accordance with an embodiment of the invention follows.

EXPERIMENT 1

Nanoparticle Sample Preparation

Aqueous-based nanoparticle solutions were used in experiments described herein, although it will be understood that other nanoparticle preparations may be used. Commercial Ag and Au nanospheres were obtained from BBI Corporation (distributed by Ted Pella) in nominal sizes varying from 20 nm diameter to 80 nm diameter. Solution concentrations were provided by the manufacturer and varied from $10^{11}$ to $10^{10}$ sols/cm$^3$, depending on particle size. Nanoparticle solutions were diluted using deionized water as needed. Table 1 shows the concentration of all of the nanomaterials used for optical limiting measurements.

TABLE 1

Description of nanoparticles used in optical limiting experiments and their concentration

| Nanoparticle Description | Concentration used (particles/cm$^3$) |
|---|---|
| 80 nm Ag sphere, BBI | $1 \times 10^9$ |
| 50 nm Au sphere, BBI | $2.6 \times 10^{10}$ |
| OB208 Au urchin, specially synthesized | $5 \times 10^9$ |
| OB207 Au urchin, specially synthesized | $5 \times 10^9$ |

Au nanourchins were prepared using the procedure described in O. Bakr, B. H. Wunsch, and F. Stellacci, "High-yield synthesis of multi-branched urchin-like gold nanoparticles," Chem. Mater. 18, 3297-3301 (2006). In a typical synthesis, 6.5 µL of a 35 vol % water solution of $H_2O_2$ was added to 10 mL of a $6.8 \times 10^{-3}$ M solution of sodium citrate. A total of 25 µL of a 0.05 M $HAuCl_4$ water solution was added dropwise over a period of 120 s for the solution designated as OB207 and 180 s for OB208. Stirring was stopped 10 s after the addition was completed. During the addition, the color of the solution changed from transparent to purple. Within less than a minute (i.e., 150 s after the complete addition of $HAuCl_4$), 1.05 mL of a 7.5-mM aqueous solution of 11-mercaptoundecanoic acid (MUA) was added dropwise while stirring. We found it necessary to add NaOH (1:5 molar ratio) to make the MUA molecule soluble in water prior to its addition to the reaction vessel. The product of this synthesis reaction in the absence of MUA addition converted to conventional spherical Au nanoparticles within a few days. The concentration of this nanoparticle solution was obtained by matching its plasmonic signature to the appropriate plasmonic signature of commercial Au nanoparticles whose concentration has been provided by manufacturer (BBI Corporation). The concentration of the final urchin was assumed to be the same as that of the intermediate Au nanospheres, ignoring the small fraction of gold atoms converted to the nanospines. We estimate our error in assessing nanourchin concentration as ±25% based on this method.

FIG. 1 shows TEM micrographs of the two Au urchin samples analyzed, OB207 and OB208, in accordance with an embodiment of the invention. The clustering of nanoparticles seen in the micrographs is the result of sample drying for the TEM analysis preparation; the individual nanoparticles are well dispersed in the solution. The slower addition of $HAuCl_4$ (aq.) during the urchin synthesis results in more pronounced branches in OB208. The majority of the nanoparticles have a diameter of ≦50 nm. However, larger particles are observed of nearly twice the size, especially for the sample OB208.

Figure 2:
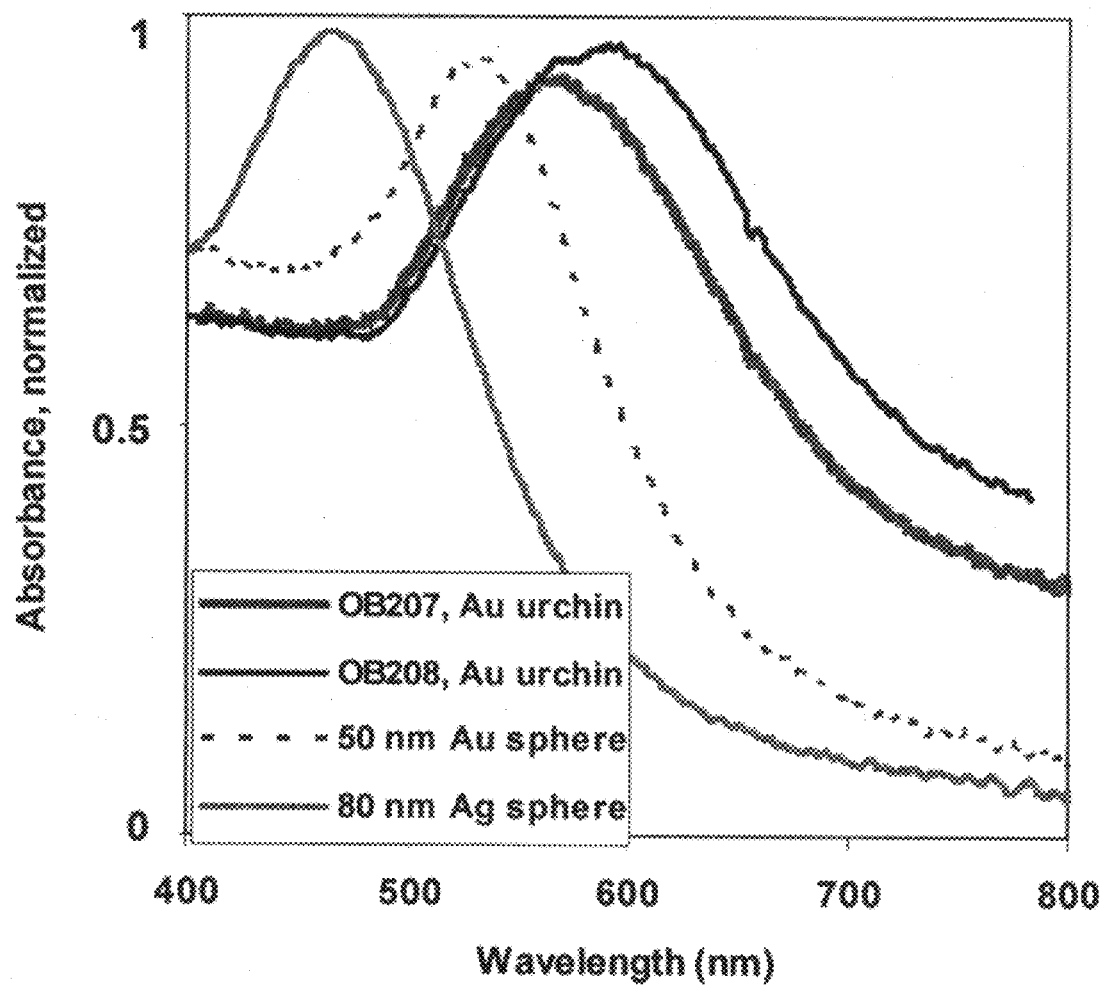
FIG. 2 shows normalized absorbance spectra, on a linear scale, of two nanourchin solutions, along with spectra of gold nanospheres and silver nanospheres, in samples analyzed in an experiment carried out in accordance with an embodiment of the invention.

FIG. 2 shows normalized absorbance spectra, on a linear scale, of the two nanourchin solutions, along with spectra of Au nanospheres of nominally 50 nm in diameter and Ag nanospheres of 80 nm diameter, analyzed in accordance with an embodiment of the invention. Both urchin samples have a plasmonic absorbance peak that is red-shifted with respect to that of the Au spheres: OB207 is red-shifted by 25 nm and OB208 by 60 nm. Such a shift is consistent with a perturbation of the plasmonic resonance of the nanosphere. Additionally, OB208 exhibits a broader peak than OB207. From our modeling of the nanourchin shapes, discussed below, the red shift is consistent with the more developed spines in the OB208 solution (see FIG. 9 and associated discussion).

In addition to the Au nanoparticles, the Ag nanospheres were selected in order to compare the optical limiting behavior of the two metals. We chose somewhat larger Ag nanospheres (80 nm) than Au nanospheres (50 nm), in order to maximize a degree of spectral overlap between the plasmonic absorbance of the Ag and Au nanospheres, enabling a better comparison of the optical limiting behavior at the common wavelengths of ~500-550 nm (see FIG. 2).

EXPERIMENT 2

Optical Limiting Measurement

For the optical limiting characterization, we have chosen the Z-scan method described in M. Sheik-Bahae, A. A. Said, and E. W. Van Stryland, "High-sensitivity, single-beam $n_2$ measurements," Opt. Lett. 14, 955-957 (1989). In this technique, a thin sample is placed in a focused beam, where the intensity varies along the optical axis (Z-axis), and the transmission is recorded as a function of Z-position. Changes in transmission are then analyzed in terms of the sample's intensity-dependent optical properties, including the real and imaginary parts of the nonlinear index, the latter being related to two-photon absorption (see also further discussion below).

Figure 3:
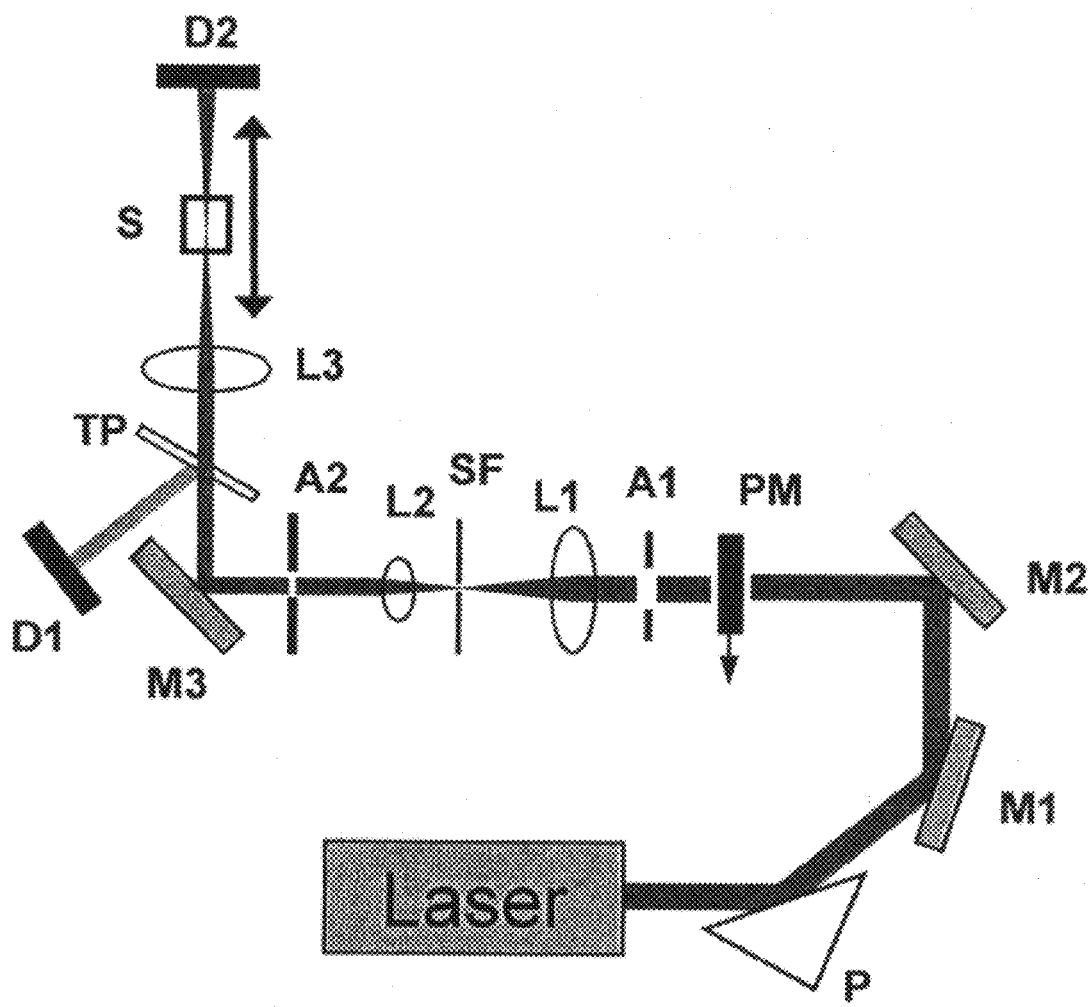
FIG. 3 is an experimental schematic of a Z-scan optical limiting setup used in experiments conducted in accordance with an embodiment of the invention.

FIG. 3 is an experimental schematic of a Z-scan optical limiting setup used in experiments conducted in accordance with an embodiment of the invention. The laser source is a Continuum EX Plus OPO system which produces tunable radiation from near-IR down to 215 nm. For the purpose of this study, we have utilized the 450-nm to 650-nm interval. The pulsewidth of the laser is 7 ns FWHM and the pulse repetition rate is 30 Hz. The laser output was attenuated by a glancing incidence reflection from a 90° $CaF_2$ prism, P. After reflection from two turning mirrors, M1 and M2, the incident light power was monitored with a power meter, PM (PM-2, Coherent Corporation). Thereafter, the light was incident on a spatial filter assembly, consisting of an iris aperture, A1, an achromat lens L1 (f=100 mm), a spatial filter pinhole, SF, an achromat lens L2 (f=50 mm) and a final iris, A2, to produce a beam nominally 2.5 mm in diameter. After another steering mirror, M3, the laser light was incident onto the Z-scan assembly.

In the Z-scan assembly, a small fraction of the light was picked off with a 1-mm-thick $SiO_2$ plate (TP) and directed onto a pyroelectric energy detector, D1 (J5-09, Coherent). The main portion of the beam was incident onto an achromat lens L3 (f=150 mm). Light from the lens was focused through the sample S, which was mounted onto a linear 80-mm translation stage that moved the sample along the beam direction through focus. Nanoparticles in water solution were placed into a 2-mm-thick cuvette. The focusing lens L3 has a depth of focus of 3.5 mm in water, which is sufficiently larger than the sample (cuvette) thickness, and therefore the beam diameter can be treated as nearly constant throughout the cuvette. The beam waist was ≈150 μm in diameter at focus. Finally, the transmitted light was incident onto a second pyroelectric detector D2 (J5-09, Coherent). Beam profiling was performed at every point along the Z-scan stage to obtain the beam dimensions (WinCamD, DataRay Corporation) and hence the intensity along the Z-axis.

The pulse-to-pulse stability of the Continuum laser is quite poor, with a full range exceeding ±50% of the mean over a 60-pulse train. Therefore, as the sample was translated through focus, the transmission was acquired on a pulse-by-pulse basis. For each pulse, a ratio of the reference detector D1 to the transmission detector D2 was recorded. Sixty pulses were acquired for every 1-mm of translator position, and data restriction techniques were used for the data processing, as discussed in P. B. Chapple, J. Staromlynska, J. A. Hermann, T. J. McKay, and R. G McDuff, "Single-beam Z-scan: measurement techniques and analysis," J. Nonlinear Optical Physics and Materials 6, 253-293 (1997). In this method, at every translator position, we only keep the transmission data when the input energy falls within well-defined limits, such as within <10% of the mean value.

Z-scan data were collected for wavelengths from 450 nm to 650 nm. At the end of most scans, we observed a dark comet-like trace in the solution, originating at the irradiation point and corresponding in size to the focused beam. The solutions, therefore, were agitated after every scan, and this caused the dark spots to disappear.

Experimental Results

Figure 4:
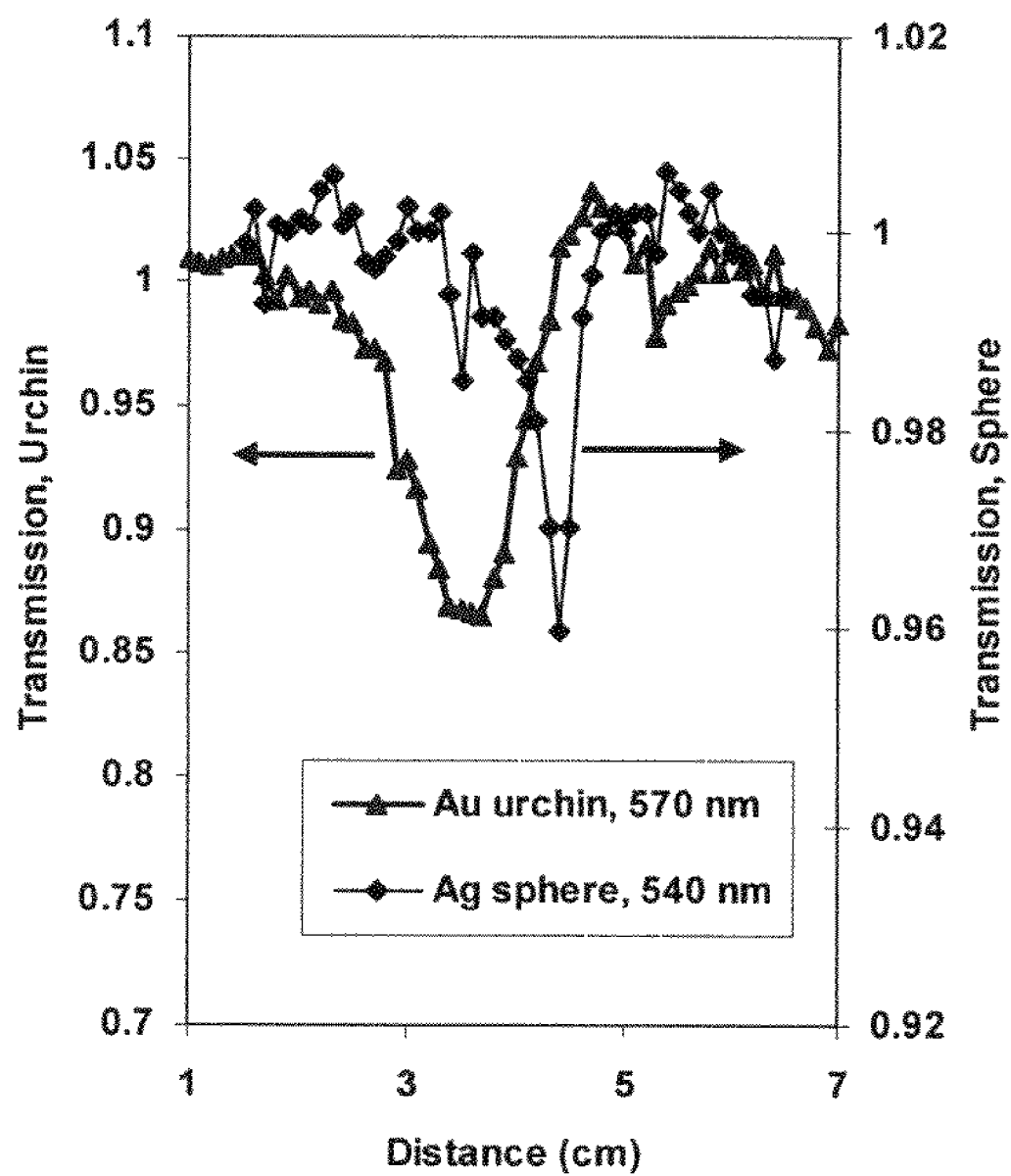
FIG. 4 shows representative Z-scans of a gold nanourchin solution and a silver sphere solution, from an experiment carried out in accordance with an embodiment of the invention.

FIG. 4 shows two typical Z-scans for the 80-nm diameter Ag spheres at 540 nm, and for the Au urchins (sample OB208) at 570 nm, in accordance with an embodiment of the invention. The Z-scan traces are typical of nonlinear phenomena, where the maximum change in transmission yields information on the magnitude of the nonlinear effect. The observed drop in transmission is indicative of intensity-dependent absorption, which we analyze for the sake of simplicity as a two-photon absorption process. The fact that the transmission dips are not at the same position along the focusing axis for the two samples is an experimental artifact, due in part to the difference in the wavelengths and the attendant chromatic aberration of the focusing lens, and also to system realignment between the two experiments. In either case, each trace is analyzed separately, according to the following formalism: for an open aperture Z-scan, the experimentally observed maximum dip in transmission, $\Delta T$, determines $Q_0$ via Equation (1) below:

$$\Delta T = \left| 1 - \frac{1}{Q_0}\ln(1+Q_0) \right|, \quad (1)$$

and $Q_0$ is defined by $$Q_0 = \beta I_0 (1-e^{-\alpha L})/\alpha \quad (2)$$

In Equation (2), $\beta$ is the effective two-photon absorption coefficient in cm/W, $I_0$ is the peak intensity in W/cm$^2$, $\alpha$ is the linear absorption coefficient in cm$^{-1}$ and L is the geometrical sample length in cm. Thus, the measured $\Delta T$ leads to $\beta$, since the other parameters have been determined independently. Once $\beta$ is obtained from Equations (1)-(2), the two-photon cross section per nanoparticle, $\gamma$, in units of GM (1 GM=10$^{-50}$ cm$^4$·sec/(photon·sol) is obtained from:

$$\gamma = 10^{50} \beta/c, \quad (3)$$

where c is the sol concentration.

Figure 5:
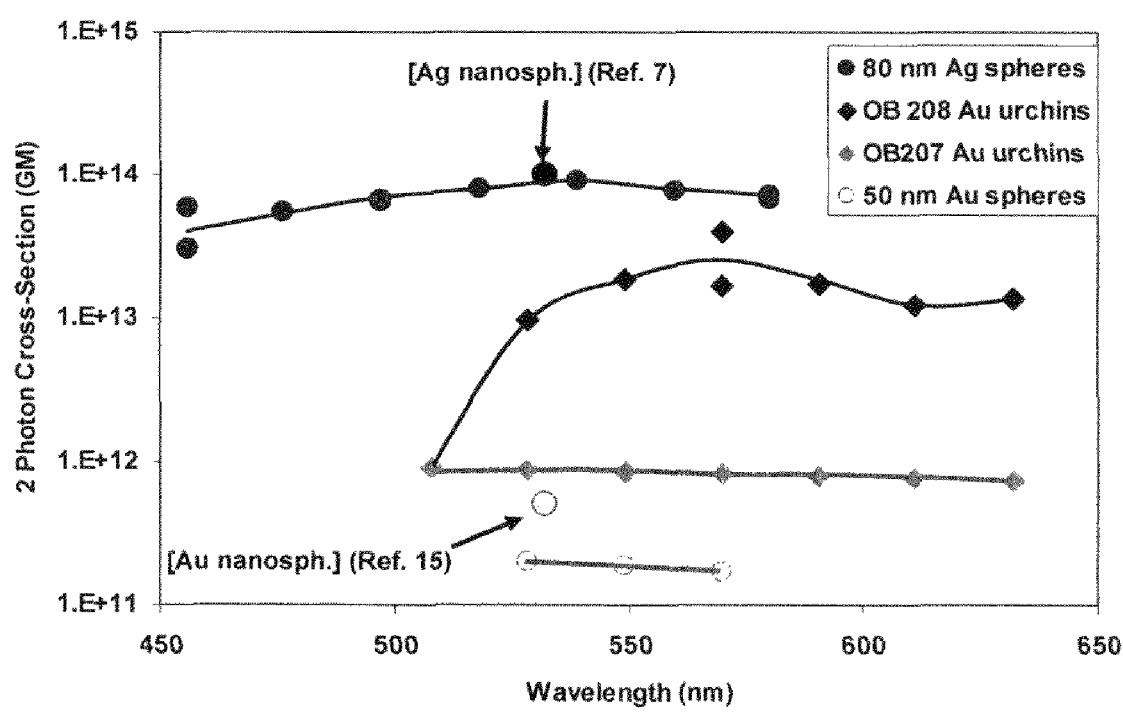
FIG. 5 shows two-photon cross-sections that were experimentally derived from Z-scan measurements for a gold nanourchin solution and for a silver sphere solution, in an experiment carried out in accordance with an embodiment of the invention.

FIG. 5 shows the two-photon cross-sections that were experimentally derived from the Z-scan measurements for the Au OB208 nanourchin solution and for the 80-nm Ag sphere solution, in accordance with an embodiment of the invention. Grayed-out symbols refer to the upper-limit estimates for data points below detection limits. Also superimposed on the graph are values derived from two previous optical limiting studies with nanospheres; see R. B. Martin, J. M. Meziani, P. Pathak, J. E. Riggs, D. E. Cook, S. Perera, and Y.-P. Sun, "Optical limiting of silver-containing nanoparticles," Opt. Mater. 29, 788-793 (2007); and G. Wang and W. Sun, "Optical limiting of gold nanoparticle aggregates induced by electrolytes," J. Phys. Chem. B 110, 20901-20905 (2006). No detectable signal was obtained from the reference Au sphere solution or from the OB207 nanourchins. However, from the analysis of the experimental data we are able to derive an upper limit for the two-photon cross-section for these two solutions, and they are also shown in FIG. 5 as grayed-out symbols. There are several previous reports on optical limiting behavior of plasmonic nanoparticles. However, a comparison of the published results to our work is not always possible, because of the lack of consistent nomenclature among different experimental reports. For instance, the optical limiting effect is frequently not presented in terms of two-photon absorption, all the experimental conditions are not always listed (such as concentration), or the experimental conditions are very different from ours (much higher peak intensity or fluence), in which case other processes may be dominant, such as thermally induced scattering. The two-photon cross sections derived from literature data that were obtained under similar conditions to ours are also included in FIG. 5; they are for 5-40 nm-sized Ag nanospheres (R. B. Martin, J. M. Meziani, P. Pathak, J. E. Riggs, D. E. Cook, S. Perera, and Y.-P. Sun, "Optical limiting of silver-containing nanoparticles," Opt. Mater. 29, 788-793 (2007)) and 5-20 nm Au nanospheres (G. Wang and W. Sun, "Optical limiting of gold nanoparticle aggregates induced by electrolytes," J. Phys. Chem. B 110, 20901-20905 (2006), and are in good agreement with our data. The main observation from FIG. 5 is that orders-of-magnitude enhancement in the two-photon cross section of Au nanospheres can be achieved by either changing the material from Au to Ag, or by changing the shape, from a sphere to an urchin.

The spectral dependence of the two-photon absorption cross-section of the Ag spheres (FIG. 5) is considerably broader than the corresponding linear plasmonic absorption (FIG. 2). It overlaps the plasmonic absorption peak at ≈460 nm, but extends further to the red, to at least 580 nm.

Figure 6:
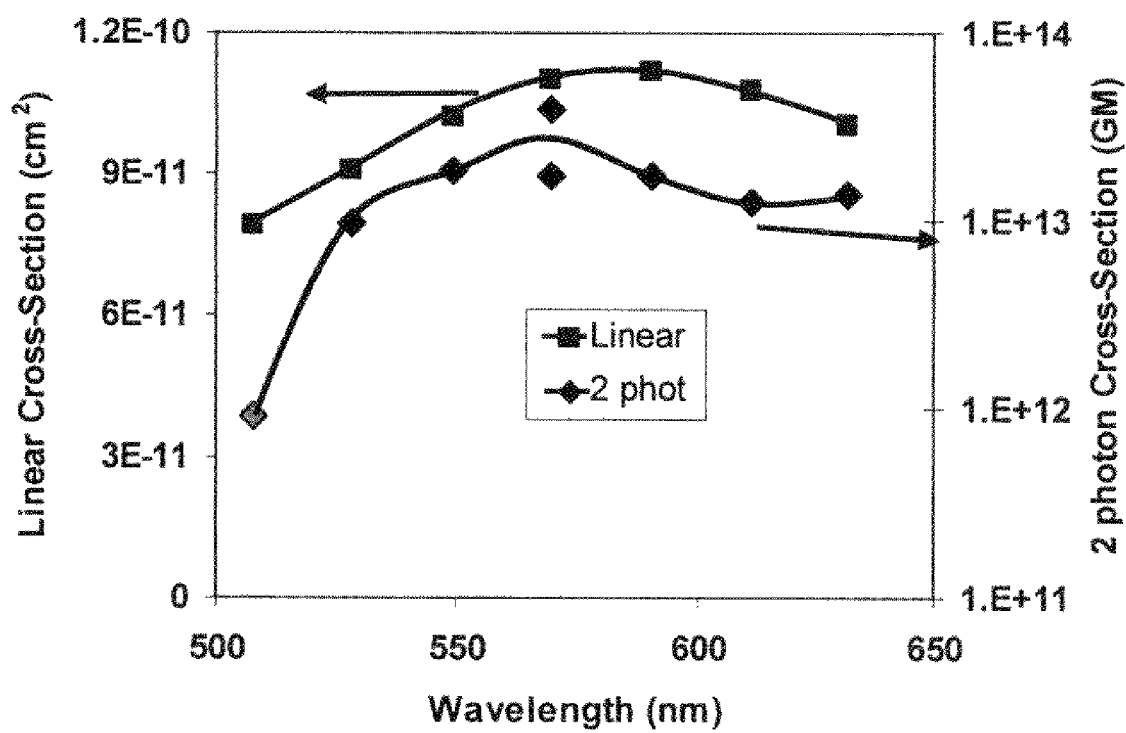
FIG. 6 compares the behavior of the linear absorption cross-section and two-photon absorption cross-section of gold nanourchins, in an experiment carried out in accordance with an embodiment of the invention.

FIG. 6 compares the behavior of the linear and two-photon absorption of Au urchins (sample OB208), in accordance with an embodiment of the invention. The two-photon absorption cross-section is shown as diamonds and the linear absorption cross-section is shown as squares, for the Au nanourchins. Solid lines are drawn to guide the eye. The two-photon coefficient drops off to the blue of the plasmonic resonance by at least one order of magnitude between 530 nm and 510 nm, while the linear absorption decreases only ~15%; however, closer to the plasmonic resonance on either its blue or red side, the two-photon cross section is relatively insensitive to changes in linear absorbance.

Discussion of Experimental Results

The optical limiting behavior of plasmonic nanoparticles can be viewed heuristically as arising from a two-photon absorption process, which becomes increasingly significant at higher incident fluences. Even though the underlying mechanisms can be more complex (see also discussion in connection with numerical simulations, below), the two-photon absorption mechanism provides a convenient framework within which to analyze current and future results, establish metrics for comparing results, and identify paths to optimization, in accordance with an embodiment of the invention. In this analysis we employ an effective two-photon absorption cross section $\gamma$, as defined in Equation (3) above. Its value is a function of both the material of the nanoparticle and its geometry (FIG. 5), which we attribute to the plasmonic electric field enhancement inside the nanoparticle, in accordance with an embodiment of the invention. In our model this field enhancement is the underlying driving force of the optical limiting effect, consistent with the more rigorous numerical simulations of the electric field inside nanoparticles discussed below. Here we limit ourselves to a brief analysis of the optical limiting of an ensemble of nanoparticles in terms of $\gamma$ and the linear plasmonic absorption cross section $\sigma$.

We are interested in the far-field transmission of the homogeneous ensemble of nanoparticles, i.e., the variation of $F_{out}$ with $F_{in}$, where F designates fluence. The differential equation, combining both one- and two-photon absorption inside a slab of thickness dx in the material, can be written as $$\frac{dF}{dx} = -\sigma c F - \frac{\gamma}{\tau} c F^2 \qquad (4)$$

For a given input fluence level $F_{in}$, the output fluence, $F_{out}$, from Equation (4) is:

$$F_{out} = \frac{\sigma \tau}{\gamma \left( e^{\sigma c x} \left(1 + \frac{\sigma \tau}{\gamma F_{in}}\right) - 1 \right)} \qquad (5)$$

In the above equation, $\tau$ is the pulsewidth, c is the sol concentration and x is the pathlength. A convenient metric to describe optical limiting is the quantity $F_{in}^{50}$, which is the input fluence at which the output fluence drops to 50% of the value predicted by linear transmission alone. Lower $F_{in}^{50}$ values indicate a stronger optical limiting effect. From Equation (5):

$$F_{in}^{50} = \frac{\sigma \tau}{\gamma} \left( \frac{1}{1 - e^{-\sigma c x}} \right) \qquad (6)$$

As expected, Equation (6) implies that $F_{in}^{50}$ is inversely proportional to $\gamma$. It also shows the dependence on the other parameters: plasmonic absorption cross section, the concentration, and the pathlength. For optical limiting application, the goal is reducing $F_{in}^{50}$ without sacrificing transparency at lower fluences, i.e., in the linear regime. Assuming a lower limit on the linear transparency to be $1/e$, this condition determines the maximum concentration-pathlength product:

$$cx = \frac{1}{\sigma}, \qquad (7)$$

With this additional condition, and substituting (7) into (6), the input fluence to achieve 50% limiting will occur when $$F_{in}^{50} = \frac{1.58 \sigma \tau}{\gamma} \qquad (8)$$

Thus, an optimal limiting effect would be achieved for small $\sigma$ and large $\gamma$. These two quantities are not intrinsically dependent on each other, as FIGS. 2, 5, and 6 demonstrate. For instance, Ag spheres at 600 nm satisfy the requirement for $\sigma$ and $\gamma$ values better than Au urchins at 500 nm. As an illustration, we calculate the value of $F_{in}^{50}$ at wavelengths corresponding to the maximum linear absorbance of the respective particles, i.e., when one-photon absorption competes most effectively with the two-photon process responsible for optical limiting. For spherical nanoparticles, $\sigma$ can be calculated directly from Mie theory, as has been validated experimentally. See J. Yguerabide and E. E. Yguerabide, "Light-scattering submicroscopic particles as highly fluorescent analogs and their use as tracer labels in clinical and biological applications. II. Experimental characterization," Anal. Biochem. 262, 157-176 (1998). For the nanourchin material, $\sigma$ is obtained by comparing the experimental absorbance values of the nanourchin solution with those of the starting nanosphere solution and assuming that the particle density is not significantly changed. Thus, the peak $\sigma$ of 80-nm Ag spheres in water is $4.5 \times 10^{-10}$ cm$^2$/sol. For the 50-nm Au spheres, the peak $\sigma$ is $8 \times 10^{-11}$ cm$^2$/sol, while that of derived nanourchins is $\approx 50\%$ larger, $1.2 \times 10^{-10}$ cm$^2$/sol. Combining the above cross-section data with the peak values of $\gamma$ from FIG. 5, we estimate that for a 5-ns laser pulse, the $F_{in}^{50}$ values are 0.8 J/cm$^2$ for both 80-nm Ag spheres and OB208 Au urchins and $\geq 60$ J/cm$^2$ for 50 nm Au spheres.

EXPERIMENT

Numerical Simulations

We model the optical limiting behavior of plasmonic nanoparticles as the result of an effective two-photon absorption process, which is enhanced by the near-field plasmonic effects, in accordance with an embodiment of the invention. We have modeled the field enhancements using a finite-difference time-domain (FDTD) method. See A. Taflove and S. C. Hagness, Computational electrodynamics. The finite-difference time-domain method, (Artech House, Inc. 2005). FDTD simulations were performed with the OptiFDTD software package (Optiwave Corporation).

Figure 7A:
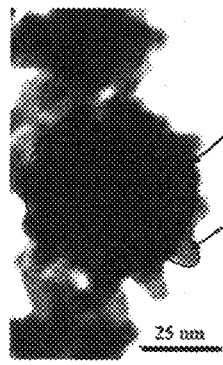
Figure 7B:
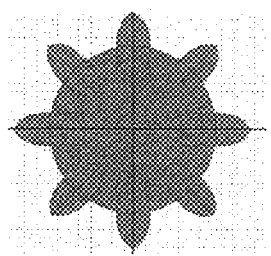
Figure 7C:
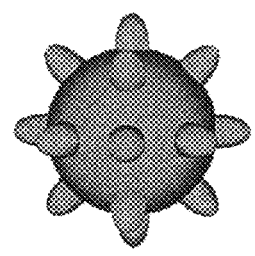

FIGS. 7A-7C show our method for decomposing an urchin into a simulation geometry having a main spherical body and a set of ellipsoid spines, based on the transmission electron micrograph of the urchin shown in FIG. 7A, in accordance with an embodiment of the invention. See O. Bakr, B. H. Wunsch, and F. Stellacci, "High-yield synthesis of multi-branched urchin-like gold nanoparticles," Chem. Mater. 18, 3297-3301 (2006).

Figure 8:
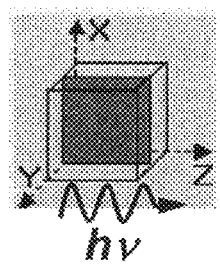
FIG. 8 shows a finite-difference time-domain coordinate system used for a simulation of a nanourchin in accordance with an embodiment of the invention.

FIG. 8 shows the FDTD simulation coordinate system used for the simulation of the nanourchin in accordance with an embodiment of the invention. A representative urchin geometry is defined in such a way that each of the Cartesian simulation planes through the center of the main body (X-Y, X-Z and Y-Z) contains 8 spines spaced at 45 degree angles, for a total of 18 spines per urchin. An XZ plane slice through the center of the structure is shown in FIG. 7B, and a corresponding simulated three-dimensional shape is shown in FIG. 7C. A plane wave is incident along the z-axis and polarized along the x-axis (FIG. 8). Most of the field analysis is performed over the XZ plane through the center of the structure. We assume an aqueous medium with n=1.33 and no wavelength dispersion. For the Au material, we use a Drude-Lorentz dielectric constant parameterization with an appropriate time-domain transformation for the FDTD method. See A. D. Rakic, A. B. Djurisic, J. M. Elazar, and M. L. Majewski, "Optical properties of metallic films for vertical-cavity optoelectronic devices," Appl. Opt. 37, 5271-5283 (1998). The grid spacing for all simulations is 0.3 nm. Absorbing boundary conditions are used in the +/−z direction, and periodic boundary conditions are used along the other two directions. We vary urchin spine length by changing the semi-major axis of the spine ellipsoid from 0 nm (no spines) to 15 nm, while leaving the semi-minor axis fixed at 5 nm and the main body diameter fixed at 50 nm. We also vary the main body size from 30 nm to 80 nm diameter, while leaving the spine fixed at a 2:1 aspect ratio and a 10 nm semi-major axis.

Figure 9:
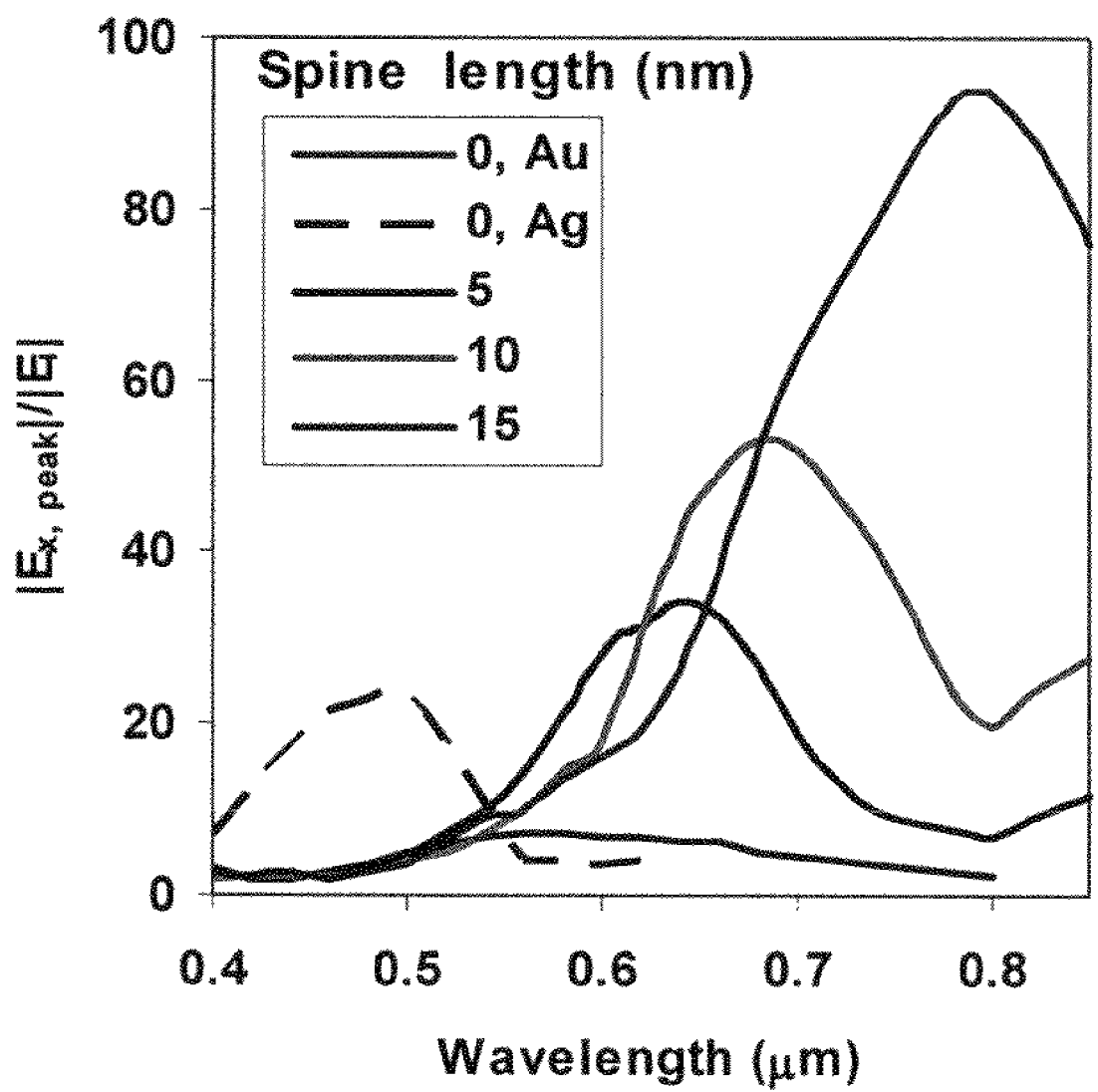
FIG. 9 is a graph of the maximum electric field amplitude versus wavelength for nanourchin structures with different spine lengths, in accordance with an embodiment of the invention.

We first obtain the optical resonance of the structure by calculating the maximum electric field as a function of wavelength obtained anywhere in the XZ plane through the center of the structure. FIG. 9 is a graph of the maximum $E_x$ electric field amplitude versus wavelength for Au nanourchin structures with different spine lengths in an aqueous ambient, in accordance with an embodiment of the invention. Also shown in FIG. 9 is the result of the same calculation for a Ag sphere with 80 nm main body diameter. The electric field amplitudes are normalized to the incident field. The "0-nm" spine length refers to a sphere with no spines. The main body is 50 nm diameter for all structures, except for the Ag sphere whose main body is 80 nm diameter. The spine length is listed as the semi-major axis of an ellipsoid (see FIG. 7). In all cases, the semi-minor axis of the spine is fixed at 5 nm. The resonance of the nanoparticles shifts to higher wavelengths and the field intensity grows substantially as the aspect ratio of the spines becomes larger. While the results of FIG. 9 are not averaged over all polarization directions and observation planes, they do indicate that the spine geometry (size and aspect ratio) can play a critical role in field enhancement. As expected, a silver sphere has a significantly higher field enhancement than a gold sphere.

The measured resonance red-shift of FIG. 2 for OB208 is 60 nm. Correlating this red shift with FIG. 9 suggests that the majority of the spines in sample OB208 have a 1:1 aspect ratio, or 5 nm spine length. Clearly, from the TEM photographs (FIG. 1 and FIG. 7A), there is a distribution of spine sizes on each main body. The calculations of FIG. 9 and data of FIG. 5 strongly suggest that more developed spines will result in a higher optical limiting effect.

While changing spine length has a dramatic effect on field enhancement, changing the main body size for a fixed spine size shows no significant changes in resonance behavior. In results not shown here, only a minor red shift of the resonance position is observed as the urchin body is decreased from 80 to 30 nm, while the spine size remains fixed at 2:1 aspect ratio and a 10 nm spine length. These results suggest that when the spines are developed, they dominate the resonance behavior of the structure and that variations in the main body size as observed in FIG. 1 are not significant for the optical limiting effect.

Figure 10:
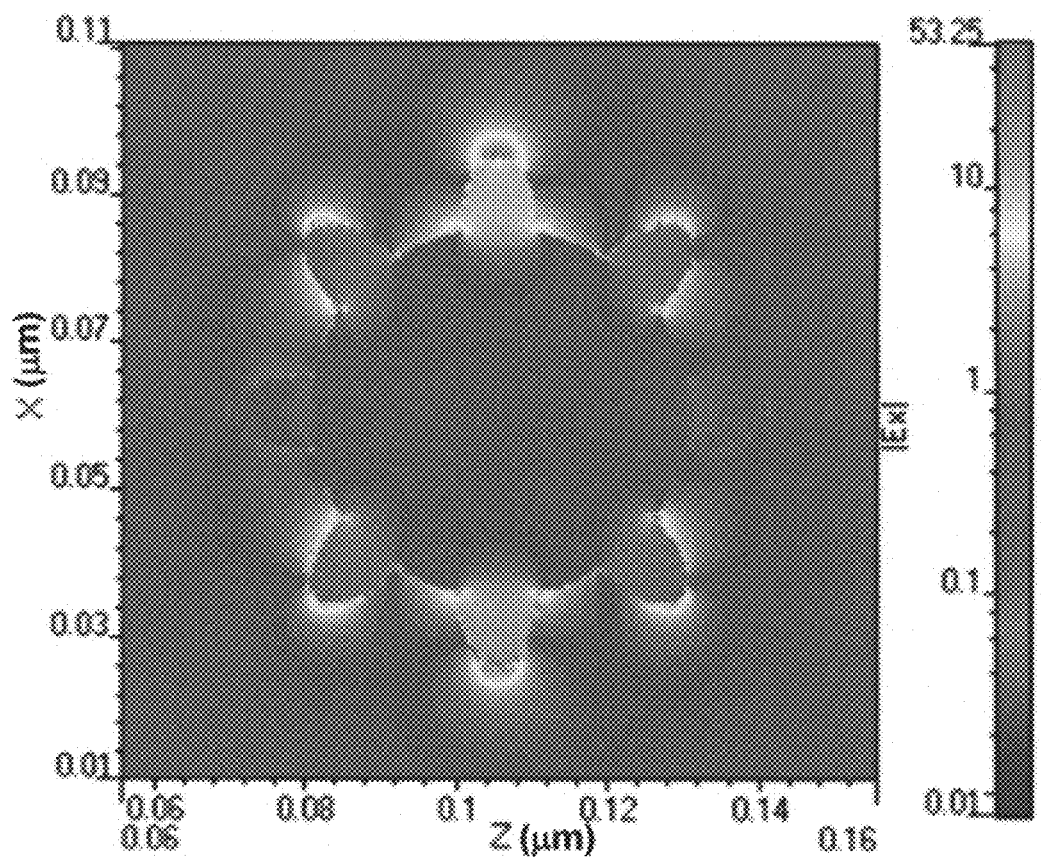
FIG. 10 shows an electric field magnitude map in the XZ plane for a gold nanourchin from FIG. 9 with 10-nm spine length at its resonant wavelength, in accordance with an embodiment of the invention.

FIG. 10 shows a $|E_x|$ magnitude map in the XZ plane for the Au nanourchin with 10-nm spine length from FIG. 9 at its resonant wavelength of 680 nm, in accordance with an embodiment of the invention. The field magnitude is shown on a logarithmic scale. Most of the field enhancement occurs along the x-polarization direction at the spine tips, though some enhancement does occur for the nearest diagonal tips as well. For obtaining the most efficient plasmonic enhancement, multi-spine structures are preferable to individual nanorods because no alignment of the structure is needed with respect to the incident field.

Figures 11A, 11B, 11C, 11D:
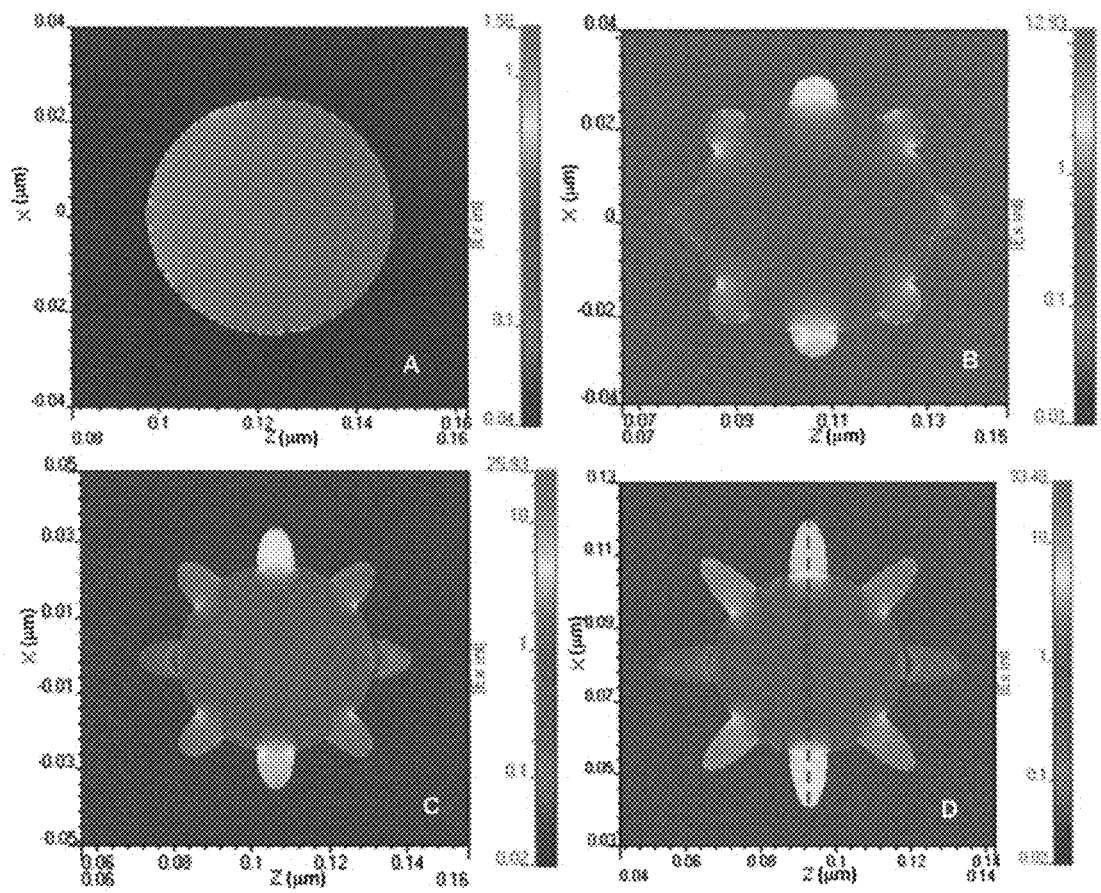
FIGS. 11A-D are interior electric field magnitude maps in the XZ plane for nanourchins of various spine aspect ratios, in accordance with an embodiment of the invention, at their respective resonant wavelengths where the fields outside the structures are set to be near zero.

The highest fields for the plasmonic structures occur just outside the elongated tips, and this is critical for the enhancement of processes that occur on or above the particle surface, such as surface-enhanced Raman scattering (SERS). However, in optical limiting the two-photon absorption occurs inside the particle. The quantity of interest in accordance with an embodiment of the invention is in fact the electric field inside the nanoparticle, not on its surface. In a recent study of the two-photon photoluminescence of Au nano-bowties, the authors computed the internal electric field enhancement to correlate with the experimental signal. See P. J. Schuck, D. P. Fromm, A. Sundaramurthy, G. S. Kino, and W. E. Moerner, "Improving the mismatch between light and nanoscale objects with gold bowtie nanoantennas," Phys. Rev. Lett. 94, 017402 (2005). Similarly, in the numerical simulations carried out in accordance with an embodiment of the invention, we have visualized the interior fields of nanourchins for various spine aspect ratios at their respective resonant wavelengths by setting the fields outside the structures to be near zero (to a small non-zero number to permit logarithmic intensity scaling). These XZ plane profiles are shown in FIGS. 11A-11D. (Note the different intensity scales for each structure). FIGS. 11A-11D show the internal $|Ex|$ field distribution (on log scale) in the XZ plane for structures used in FIG. 9 at their respective resonances. The spine lengths of the structures are, in FIG. 11A, 0 nm; in FIG. 11B, 5 nm; in FIG. 11C, 10 nm; and in FIG. 11D, 15 nm. The dashed line through the center section of FIG. 11D shows the location of the cut, displayed in FIG. 12. Note that the maximum field values, indicated on the color scale, occur at the very edges of the structures.

From FIGS. 11A-11D, we observe that the peak values of the interior electric fields increase dramatically when the spines grow. This trend is the same as that captured in FIG. 9, which represents the total electric field, dominated by the external values. The main difference between FIGS. 11A-D and FIG. 9 is the absolute value of the field, which is smaller inside. For instance, for the 15-nm spines the total field has a peak value of ~90, while the internal field enhancement is a more modest peak value of ~33 (FIG. 11D). For comparison, we have also calculated the interior field distribution for a Ag nanosphere of 80 nm diameter at its resonant wavelength, shown in FIG. 9. The interior field distribution for the Ag nanosphere (not shown) looks similar to that of FIG. 11A, but the peak field values reach 3.44, a factor of 2 higher than those of the Au nanosphere.

Figure 12:
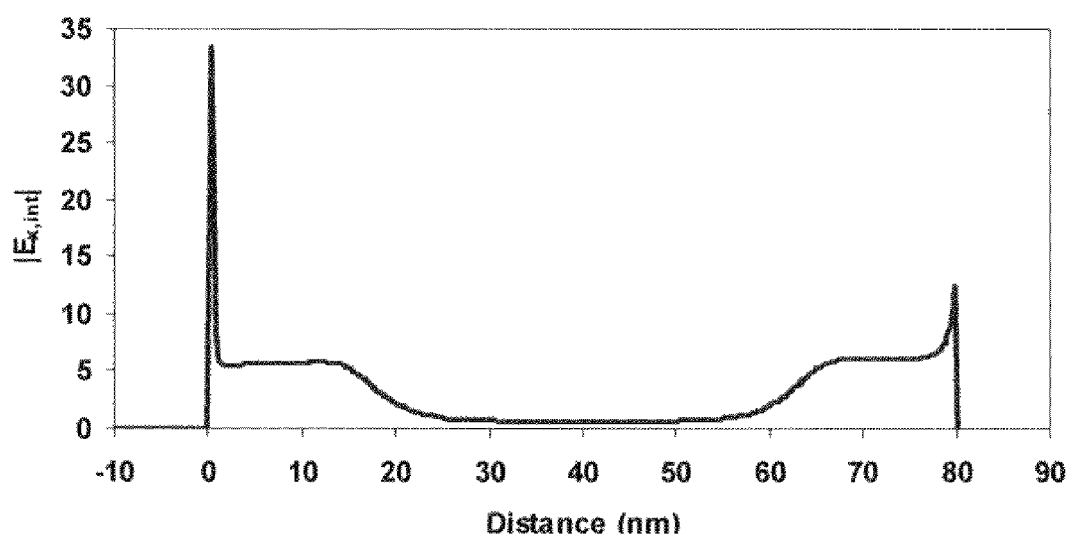
FIG. 12 is a plot tracing the electric field enhancement from one end of the nanourchin of FIG. 11D to the other, in accordance with an embodiment of the invention.

Closer inspection of the plots in FIGS. 11A-11D reveals further details that are peculiar to the plasmonic behavior of the nanourchins. FIG. 12 is a plot tracing the electric field enhancement from one end of the nanourchin of FIG. 11D to the other, with a spatial resolution of 0.3 nm, in accordance with an embodiment of the invention. FIG. 12 shows the interior $|E_x|$ field enhancement for the structure of FIG. 11D, cut along the dashed red line. Near the tip of the urchin to a depth of ~1 nm, there is in fact a high enhancement factor of ~30, which then stabilizes at ~5 through the length of the spine, to be further reduced to <1 in the spherical body of the urchin. This non-exponential behavior is clearly different from that expected from the ~35-nm skin depth of a semi-infinite Au sheet. See R. Qiang, R. L. Chen, and J. Chen, "Modeling electrical properties of gold films at infrared frequency using FDTD method," Int. J. Infrared Milli. Waves 25, 1263-1270 (2004). The difference in the peak value of FIG. 12 at 0 and 80 nm occurs because the peak electric field just below the surface is highly spatially localized, pushing the limits of simulation spatial resolution of 0.3 nm.

The difference in interior field enhancement between nanourchin structures and nanospheres is consistent with the difference in observed effective two-photon absorption as shown in FIG. 5. We believe these two effects to be related, although the specific mechanism is not yet certain. One possibility is, that the electric field enhancement inside the Au urchin increases the interband transition strength, which has been shown to cause two-photon absorption in Au. See P. J. Schuck, D. P. Fromm, A. Sundaramurthy, G. S. Kino, and W. E. Moerner, "Improving the mismatch between light and nanoscale objects with gold bowtie nanoantennas," Phys. Rev. Lett. 94, 017402 (2005); and M. R. Beversluis, A. Bouhelier, and L. Novotny, "Continuum generation from single gold nanostructures through near-field mediated intraband transitions," Phys. Rev. B 68, 115433 (2003). We note that the FDTD simulations have been performed on idealized symmetric geometries, while the nanourchins have a more complex structure. A quantitative comparison would be quite complex. First, it would require averaging the FDTD results over a statistically defined range of shapes and sizes. It would also require spatial integration of the local incident field to the fourth power, multiplied by appropriate tensor elements of the material's dielectric constant, not only comparison of the spatially-limited "hot spots" of high electric field enhancement factors. Furthermore, our implementation of FDTD has certain intrinsic limitations: it calculates a steady state field distribution, whereas field magnitudes inside the metal are expected to vary significantly throughout the duration of the laser pulse, with reported relaxation times of less than a picosecond. See J. Hodak, I. Martini, and G. V. Hartland, "Ultrafast study of electron-phonon coupling in colloidal gold particles," Chem. Phys. Lett. 284, 135-141 (1998) Also, unlike the exterior field values which can be considered truly incident fields, calculated in a non-absorbing medium, the spatial distribution of interior fields is a result of the enhanced electric field being absorbed by the gold material. Since the FDTD calculation does not explicitly take into account nonlinear absorption effects, postulated above, this spatial distribution is subject to uncertainties. The interior field calculation can be refined by assuming non-zero higher order Au susceptibility. As an example of such extensions of FDTD, Panoiu and Osgood have used FDTD modeling to describe optical limiting by directly including non-linear absorption. See N. C. Panoiu and R. M. Osgood, Jr., "Linear and nonlinear transmission of surface plasmon polaritons in an optical nanowire," Proc. Mater. Res. Soc. 846, 87-92 (2005).

In summary, in accordance with an embodiment of the invention, nanoparticles of Ag and Au have been shown to exhibit optical limiting behavior, which can be described phenomenologically as the result of two-photon absorption. Nanourchins prepared of Au have a two-photon absorption cross section that is at least one hundred times higher than that of the corresponding nanospheres. FDTD simulations have been employed to show that the plasmonic electric field enhancement due to the spines of these urchins can be very high. The combination of experimental results and simulations suggests that optical limiting in Au and Ag is consistent with, and, indeed, may result from plasmonic effects. An embodiment according to the invention provides a roadmap for further enhancing this effect, so that complex nanostructures may be prepared using a combination of chemical synthesis and simulations such that the complex nanostructures have optical limiting capabilities at practical wavelengths and incident intensities.

As a further discussion of considerations underlying an embodiment according to the invention, it is first noted that metallic nanoparticles with dimensions of about 10 to 100 nm exhibit plasmonic behavior, i.e., free electrons undergo collective oscillations which are in resonance with the incident radiation at certain wavelengths. As a result, the local electric field in the vicinity of the nanoparticle surface can be significantly enhanced. The enhancement factor depends on the material properties, the wavelength, the particle geometry, and the presence of other particles or thin films. Numerical simulations have predicted enhancement factors of 10-200, and experimentally observed phenomena such as Surface Enhanced Raman Scattering (SERS) have been attributed to it. We note in particular that such electric field enhancements result in orders-of-magnitude enhancements of the probability of other nonlinear processes as well, such as two-photon absorption. Specifically, since two-photon absorption is proportional to the square of the local intensity, i.e., to the fourth power of the local electric field, this process can be enhanced by careful design of plasmonic nanostructures very much like SERS. Consequently, the optical limiting effect sets in at proportionately lower intensities. A convenient figure of merit (FOM) of an optical limiter based on two-photon absorption is the inverse of the incident fluence where the transmission drops to below 50%:

$$\text{FOM}=1/F_{in}^{50}=(\gamma_{\text{eff}}cx)/\tau \qquad (9)$$

In the above expression, $\gamma_{\text{eff}}$ is the effective two-photon absorption coefficient, which varies as the fourth power of the local electric field, c is the volume concentration of nanoparticles, x is the thickness of the optical limiting device, and $\tau$ is the laser pulse duration. If the nanoparticles exhibit one-photon absorption in addition to the two-photon absorption, the FOM must take into account the low-intensity transmission, but fundamentally the optical limiting phenomenon is the same.

In accordance with an embodiment of the invention, it is an insight that plasmonic nanoparticles can and should be optimized by controlling the three-dimensional shape and material of each nanoparticle, as well as the geometric relationships among nanoparticles (e.g., forming them into suitable arrays, enclosing them into resonant cavities, etc.), to yield $\gamma_{\text{eff}}$ that are factors of 10,000 to 10,000,000 higher than $\gamma_{\text{eff}}$ of unoptimized, isolated metal nanospheres. If the other parameters in Equation (9) are unchanged, then the value of $F_{in}^{50}$ can be reduced proportionately by a factor of 100 to 10,000 compared to metal nanospheres. Instead of the reported approximately 100 mJ/cm$^2$, which is much too high for eye-safe use, it can be now approximately 10 µJ/cm$^2$, within striking distance of the eye-safety limits and at least 1000 times better than any other optical limiter, organic or inorganic. It is also noted that such optical limiters are very fast. The absorption process of two photons occurs nearly simultaneously, and the recovery once the laser pulse is over is equally rapid. Additional advantages of inorganic optical limiters include their environmental stability, for instance in the presence of humidity or sunlight (which often causes photo-oxidative degradation of organic compounds).

As an example of the power of the rational optimization of plasmonic materials in accordance with an embodiment of the invention, results are shown above of simulations using rigorous solutions of Maxwell's equations with the FDTD method. From the FDTD simulations, materials with the best field enhancement in the visible and near infrared regions appear to be gold and silver nanoparticles with sizes in the range of 30 to 100 nm, although other materials and sizes may be used in accordance with an embodiment of the invention. Furthermore, for a given metal, the shape of the nanoparticle can play a significant role in promoting local nonlinear field enhancement. In the experiments discussed above, the optical limiting performance of a spherical nanoparticle is compared with that of a modified spherical shape, a nanourchin consisting of a spherical body and several smaller spinelike structures protruding from it. The FDTD simulations discussed above reveal that such nanourchin shapes produce significant nonlinear field enhancement as compared to a spherical shape of the same material and nominal dimensions. The magnitude of this enhancement depends sensitively on the aspect ratio of the spines. Furthermore, the wavelength of incident light at which the nonlinear enhancement is maximized will also vary with the aspect ratio of the spines. Thus, an embodiment according to the invention permits design of an optical limiting material both for maximum efficiency and also for a specific spectral region. The results of the FDTD simulations of different spine lengths are shown above in FIG. 9. In addition to the FDTD simulations, the experiments discussed above also verified the relative strengths of nonlinear absorption coefficients of gold nanourchin solutions, and gold and silver nanosphere solutions (see FIG. 5, above). From FIG. 5, two clear trends emerge: 1) the nonlinear absorption of gold nanourchin material is at least two orders of magnitude more effective than the nonlinear absorption of corresponding gold nanospheres; and 2) the nonlinear absorption of silver material is much higher than that of gold material; in fact, silver nanospheres outperform gold nanourchins.

In accordance with an embodiment of the invention, these trends may be used together to permit further optimization of the optical limiting characteristics of the nanourchin material, for example by synthesizing nanourchins of silver. In addition, it should be noted that nanourchins are just one example of a nanoparticle geometry that may be used in accordance with an embodiment of the invention. Additional shapes may be used, both three-dimensional shapes prepared in a suspension, and two-dimensional arrays prepared by nanofabrication on substrates and thin films. The materials also include not only gold, silver and their alloys, but also aluminum, copper and indium. All may be optionally coated in thin layers of a dielectric, so as to enhance their stability: otherwise silver nanoparticles may "tarnish" (be oxidized) over time, and low-melting metals may change their shape in intense laser beams. Implementation of these optical limiting nanoshapes may involve dispersing them in a polymer matrix, which can then be used to form a protective shield for either humans or sensitive optical equipment. From Equation (9) above, higher concentrations of nanomaterial are clearly beneficial. However, in most instances there is a trade-off, since even small amounts of one-photon absorption may reduce the low-intensity transparency of the material. We also note that optical limiting devices in accordance with an embodiment of the invention are inherently amenable to spatial localization: only a domain of nanoparticles of limited spatial extent would become opaque when exposed to high-intensity lasers, while the rest of the device would remain transparent. This feature is very useful in enabling continued functioning of the protected entity (human, camera, etc.), while the functionality of only a few pixels is reduced. Another outcome of this property is the ability to combine several types of nanoparticles in near-proximity to each other, each type tailored for different wavelengths, akin to the RGB sub-pixels in color displays, thus broadening the usefulness of the devices. Thus, in accordance with an embodiment of the invention, complex nanostructures are optimized and used for optical limiting, where the optimization may involve size, shape, material, dielectric overcoat, and matching to a desired wavelength band.

Figure 13:
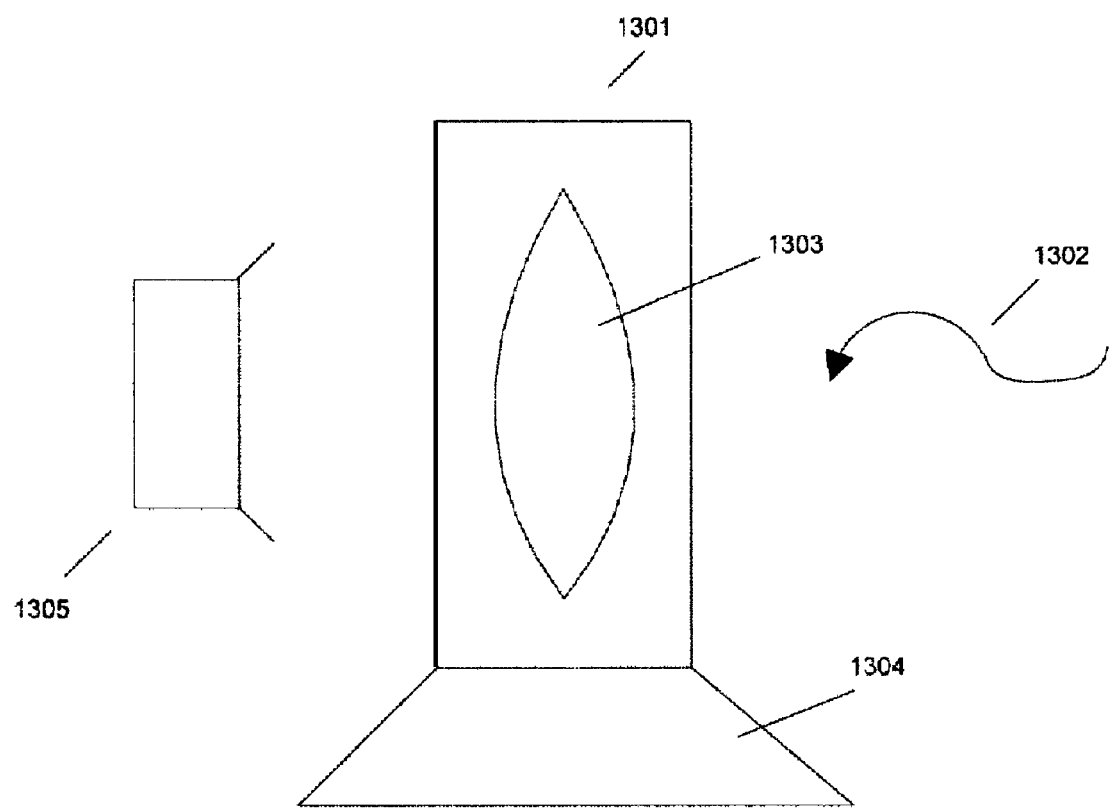
FIG. 13 is a diagram of an optical limiter device for protecting an object from incident light having a wavelength in the visible, infrared or ultraviolet spectrum, in accordance with an embodiment of the invention.

FIG. 13 is a diagram of an optical limiter device for protecting an object from incident light having a wavelength in the visible, infrared or ultraviolet spectrum, in accordance with an embodiment of the invention. The device 1301 comprises a plurality of nanoparticles of a metallic material including free electrons that undergo collective oscillations (such as plasmonic oscillations) when exposed to the incident light 1302. The plurality of nanoparticles of the metallic material include a plurality of nanoparticles of a non-spherical particle geometry. The device further comprises a structurally rigid transparent medium in which the plurality of nanoparticles of the metallic material are embedded. For example, the plurality of nanoparticles of the metallic material may be embedded in a lens 1303 that includes a structurally rigid transparent medium. A mechanical support 1304 mounts the transparent medium 1303 between the incident light 1302 and the object 1305 that is to be protected. It will be appreciated that the device 1301 may take on a variety of forms, depending on the object 1305 that is to be protected. For example, the device 1301 may be a set of goggles or other protective eye-wear that protects a wearer from high intensity incident light; and the transparent medium may be the lenses of the protective eye-wear. In addition, however, the device 1301 may protect photosensitive equipment, and in such a case the transparent medium 1303 may form a transparent sheet, a dome or other structure that is placed between the incident light and the object to be protected. For example, the device 1301 may be a windshield, or a portion of a windshield, of an airplane, helicopter, an automobile, a personnel carrier, tank or other vehicle; or may be a protective screen for a space-borne camera, satellite, detector or other instrument. In the case of a set of goggles or other protective eye-wear, the mechanical support 1304 may be a frame of the eye-wear that mounts the goggles to the wearer's eyes and/or head; and in other cases the mechanical support 1304 may be a stand, a surrounding mount, the base of a windshield, or any other mechanical support that mounts the transparent medium 1303 between the incident light 1302 and the object 1305 that is to be protected.

In further, related embodiments the non-spherical particle geometry of the nanoparticle may include a geometry having a plurality of sharp protrusions on a spherical body. For example, the sharp protrusions may be the "spine"-like structures of the "nanourchin" material discussed above; or may be other sharp protrusions on a spherical body. Such protrusions or spine-like structures may have a length of 5 nm, 10 nm, 15 nm, or longer than 15 nm. The metallic material may include one or more of gold, silver, aluminum, indium and copper. In particular the metallic material may be silver or gold. As a further example the nanoparticle may be a silver nanourchin or other silver particle with non-spherical geometry having protrusion or spine lengths of 5 nm, 10 nm, 15 nm, or longer than 15 nm. Each nanoparticle of the plurality of nanoparticles may have a largest diameter of greater than 10 nanometers and less than 200 nanometers, although other sizes within that range may be used, such as diameters of approximately 30 to 40 nm, preferably between 20 nm and 100 nm, and/or largest diameters of less than 100 nm. The non-spherical particle geometry may include a geometry that includes at least one corner; may have a geometry selected from the group consisting of a cube geometry, a pyramid geometry and a polyhedron geometry; or may include a mushroom-shaped geometry. It is believed that sharp features are particularly helpful for enhancing plasmonic effects to encourage absorption of the incident light; and in particular, spine-like structures are believed to be helpful because a particle having multiple spines aligned along many different directions may have an "active" spine absorbing incident light regardless of the direction in which the electric field is incident. The object 1305 may be one or more of a human eye, a photosensitive device, a camera, a detector, a portion of a vehicle, a portion of an airborne system, a portion of an airplane, a portion of a helicopter, a portion of a space-borne system, a portion of a rocket, a portion of a missile, a portion of a telescope and a portion of a satellite. The incident light may include light from a laser.

In further embodiments, the device may include an alloy including at least one material selected from the group consisting of silver, gold, aluminum, indium and copper. For example, an alloy of fused silver and gold may used, in any of a variety of different proportions depending on the desired region of absorbance. The transparent medium may include one or more of a polymer and a glass. For example, the transparent medium may be a polymer matrix, and the manufacturing of the device may include dispersing the nanoparticles of the non-spherical geometry in a polymer matrix. The nanoparticles may also be prepared in suspension; and/or may be prepared by nanofabrication on a substrate or a thin film. For example, patterning could be performed using lithography on a transparent substrate. The nanoparticles may be embedded in a polymer layer; and multiple thin polymer layers may be used. The polymer layer's low-level absorption may be adjusted appropriately; for example, a 50% absorption by the polymer layer may be used. One polymer layer may include one nanoparticle material, while another polymer layer includes a different nanoparticle material; or multiple different types of nanoparticle may be embedded in a single polymer layer. The nanoparticles may be arranged into an array; and may be enclosed in a resonant nanocavity. The nanoparticles, transparent medium or device as a whole may be coated with a dielectric coating. For example, silicon dioxide, titanium dioxide, aluminum oxides, hafnium oxides, metal nitrides and other materials may be used. A single layer of dielectric coating may be used, or multiple layers, including layers having alternating refractive indices. Layers may be sized in appropriate thicknesses, for example 100 nm or approximately one quarter wavelength, if desirable. The plurality of nanoparticles may include at least two different types of nanoparticles; and may include a patterning of the at least two different types of nanoparticles, such as a pixel array comprising the at least two different types of nanoparticles. For example, a 1 mm pixel area using gold nanoparticles may be placed next to a 1 mm pixel area using silver nanoparticles, etc., in a similar fashion to the RGB pixels or other types of pixels used in television and other displays. In addition, the geometry of a nanoparticle may be altered by adjusting the packing density of a feature over the surface of the nanoparticle; for example the packing density of spine-like features may be altered over the main body of a nanourchin structure. In addition, various different types of molecules may be attached to a nanoparticle, for example molecules could be attached to the spines or main body of a nanourchin structure. The device may be sufficiently robust to be used more than once to protect the object from the incident light. In addition, the device may possess environmental stability in the presence of humidity or sunlight.

FIG. 14 is a block diagram of a method of protecting an object from incident light, in accordance with an embodiment of the invention. The method comprises the step 1401 of exposing a device, positioned between the incident light and the object, to incident light of a wavelength in the visible, infrared or ultraviolet spectrum and of an intensity exceeding a threshold intensity, thereby at least substantially preventing transmission of the incident light above the threshold intensity through the device to the object. The device includes a plurality of nanoparticles of a metallic material including free electrons that undergo collective oscillations when exposed to the incident light at the wavelength in the visible, infrared or ultraviolet spectrum. The plurality of nanoparticles of the metallic material includes a plurality of nanoparticles of a non-spherical particle geometry. The plurality of nanoparticles of the metallic material are embedded in a structurally rigid transparent medium. In step 1401, the device is exposed to the incident light to thereby enhance a local electric field inside the surfaces of the plurality of nanoparticles of the non-spherical particle geometry to cause the plurality of nanoparticles of the non-spherical particle geometry to absorb the energy of the incident light above the threshold intensity and thereby at least substantially prevent transmission of the incident light above the threshold intensity through the device to the object. The method further comprises the step 1402 of exposing the device to incident light of an intensity not exceeding the threshold intensity, thereby at least substantially transmitting the incident light below the threshold intensity through the device to the object.

Figure 15:
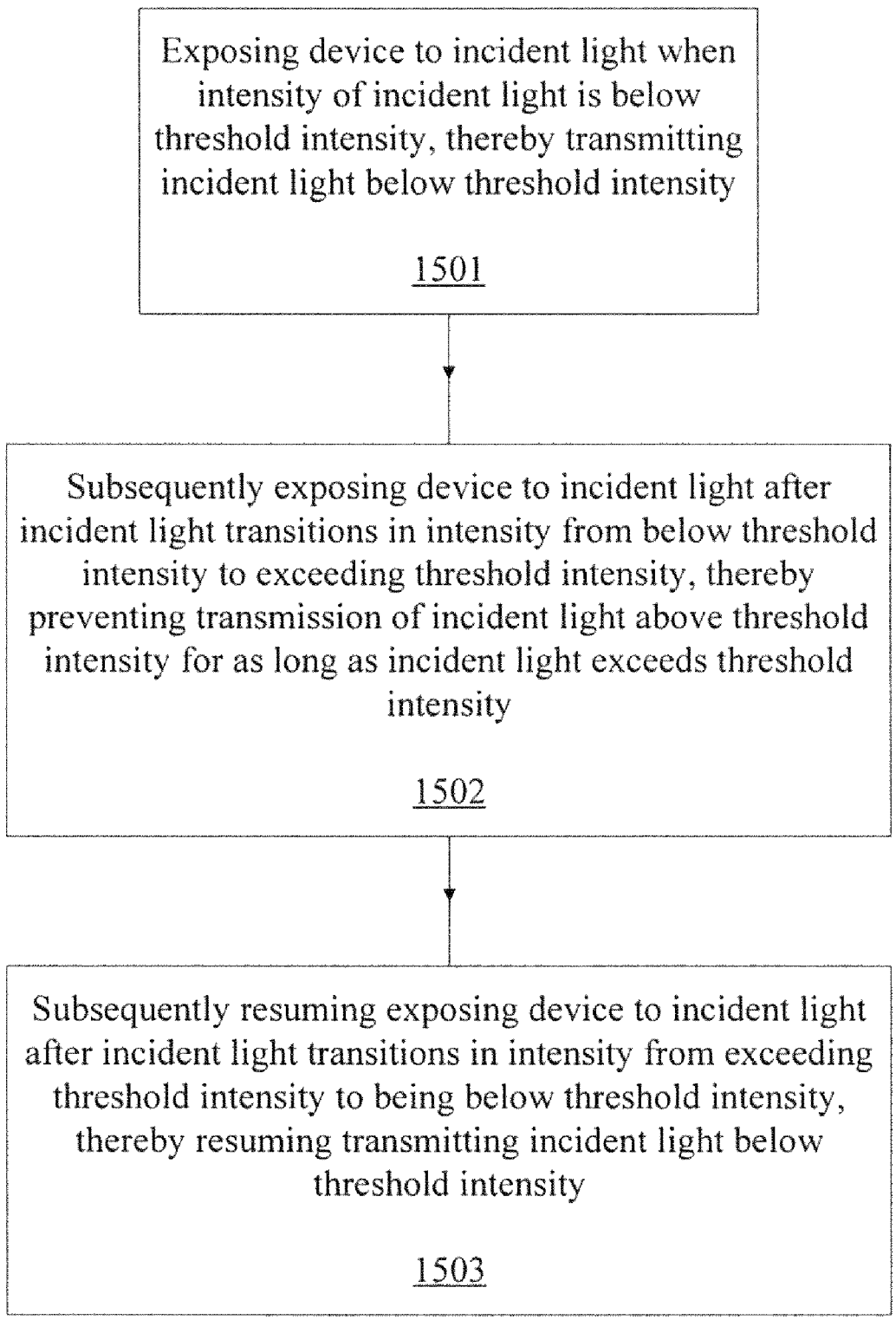
FIG. 15 is a block diagram of a further method of protecting an object from incident light, in accordance with an embodiment of the invention.

FIG. 15 is a block diagram of a further method of protecting an object from incident light, in accordance with an embodiment of the invention. The method comprises the step 1501 of exposing the device to the incident light when an intensity of the incident light is below the threshold intensity, thereby at least substantially transmitting the incident light below the threshold intensity through the device to the object. Subsequently, in step 1502, the device is exposed to the incident light after the incident light transitions in intensity from below the threshold intensity to exceeding the threshold intensity, thereby at least substantially preventing transmission of the incident light above the threshold intensity through the device to the object for as long as the incident light exceeds the threshold intensity. The method further comprises, in step 1503, subsequently resuming exposing the device to the incident light after the incident light transitions in intensity from exceeding the threshold intensity to being below the threshold intensity, thereby resuming at least substantially transmitting the incident light below the threshold intensity through the device to the object.

In further, related embodiments, the transmission of the incident light above the threshold intensity through the device to the object may essentially cease within a time of less than one nanosecond after the incident light transitions in intensity from below the threshold intensity to exceeding the threshold intensity. Similarly, when the incident light subsequently transitions in intensity from above the threshold to below it, the transmission of the incident light above the threshold intensity to the object may essentially resume within a time of less than one nanosecond or less after the transition in intensity. The threshold intensity may be 0.5 $\mu$l/cm$^2$ or less for a pulse lasting one millisecond or less, although other threshold intensities may be used depending on the object to be protected. For instance, a threshold intensity for protecting a human eye may differ from a threshold required for protecting a piece of photosensitive hardware. A threshold intensity may, for example, be as low as 1 to 10 $\mu$J/cm$^2$ in 10 nanoseconds (ns); or as low as 100 $\mu$J/cm$^2$ in 10 ns; or as low as 1 mJ/cm$^2$ in 10 ns. Transmission of the incident light above the threshold intensity through the device to the object may essentially cease at any wavelength of incident light within at least a broadband range of the visible, infrared or ultraviolet spectrum. A mixture of different shapes and materials of the nanoparticles may be used, where each different type of nanoparticle protects against transmission over a given portion of the visible, infrared or ultraviolet spectrum. For example, use of at least some silver nanoparticles allows better protection in a blue portion of the spectrum (or a blue-shifted spectrum of protection), while use of at least some gold nanoparticles allows better protection in a red portion of the spectrum (or a red-shifted spectrum of protection), while mixtures may allow better protection across a combined, broader broadband range. Gold may be used for protection in the near infrared, such as up to 800 nm or even 900 nm wavelengths. Aluminum may be used for protection in the ultraviolet portion of the spectrum. Whether using a single type of material or multiple different types, the broadband range may include a range of incident light wavelengths that overlaps at least a portion of the range from 450 nm to 650 nm. The method may include, more than once, exposing the device to the incident light to thereby at least substantially prevent transmission of the incident light above the threshold intensity through the device to the object. The transmission of the incident light above the threshold intensity through the device to the object may be at least substantially reduced over at least a broad range of angles of incidence and over at least a broad range of polarizations of incident light.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. An optical limiter device for protecting an object from incident light having a wavelength in the visible, infrared or ultraviolet spectrum, the device comprising:
   a plurality of nanoparticles of a metallic material including free electrons that undergo collective oscillations when exposed to the incident light, the plurality of nanoparticles of the metallic material including a plurality of nanoparticles of a non-spherical particle geometry, wherein the non-spherical particle geometry includes at least one member of the group consisting of a geometry having a plurality of sharp protrusions on a spherical body, a geometry that includes at least one corner, and a mushroom-shaped geometry;
   a structurally rigid transparent medium in which the plurality of nanoparticles of the metallic material are embedded; and
   a mechanical support mounting the transparent medium between the incident light and the object.

2. An optical limiter device according to claim 1, wherein the non-spherical particle geometry includes a geometry having a plurality of sharp protrusions on a spherical body.

3. An optical limiter device according to claim 1, wherein the metallic material includes at least one material selected from the group consisting of gold, silver, aluminum, indium and copper.

4. An optical limiter device according to claim 3, wherein the metallic material includes gold.

5. An optical limiter device according to claim 3, wherein the metallic material includes silver.

6. An optical limiter device according to claim 1, wherein the non-spherical geometry includes a geometry having a plurality of sharp protrusions on a spherical body and wherein the metallic material includes at least one material selected from the group consisting of gold, silver, aluminum, indium and copper.

7. An optical limiter device according to claim 6, wherein the metallic material includes gold.

8. An optical limiter device according to claim 6, wherein the metallic material includes silver.

9. An optical limiter device according to claim 1, wherein each nanoparticle of the plurality of nanoparticles has a largest diameter of greater than 10 nanometers and less than 200 nanometers.

10. An optical limiter device according to claim 1, wherein the non-spherical particle geometry includes a geometry that includes at least one corner.

11. An optical limiter device according to claim 1, wherein the non-spherical particle geometry includes a mushroom-shaped geometry.

12. An optical limiter device according to claim 1, wherein the object is selected from the group consisting of a human eye, a photosensitive device, a camera, a detector, a portion of a vehicle, a portion of an airborne system, a portion of an airplane, a portion of a helicopter, a portion of a space-borne system, a portion of a rocket, a portion of a missile, a portion of a telescope and a portion of a satellite.

13. An optical limiter device according to claim 1, wherein the incident light includes light from a laser.

14. An optical limiter device according to claim 1, wherein the device includes an alloy including at least one material selected from the group consisting of silver, gold, aluminum, indium and copper.

15. An optical limiter device according to claim 1, wherein the transparent medium includes a material selected from the group consisting of a polymer and a glass.

16. An optical limiter device according to claim 1, wherein the plurality of nanoparticles include at least two different types of nanoparticles.

17. An optical limiter device according to claim 1, wherein the plurality of nanoparticles of the non-spherical particle geometry includes at least two different types of nanoparticles, and wherein the device includes a patterning of the at least two different types of nanoparticles.

18. An optical limiter device according to claim 1, wherein the plurality of nanoparticles of the non-spherical particle geometry includes at least two different types of nanoparticles, and wherein the device includes a pixel array comprising the at least two different types of nanoparticles.

19. An optical limiter device according to claim 1, wherein the device is sufficiently robust to be used more than once to protect the object from the incident light.

20. A method of protecting an object from incident light, the method comprising the steps of:
   exposing a device, positioned between the incident light and the object, to incident light of a wavelength in the visible, infrared or ultraviolet spectrum and of an intensity exceeding a threshold intensity, thereby at least substantially preventing transmission of the incident light above the threshold intensity through the device to the object, the device including a plurality of nanoparticles of a metallic material including free electrons that undergo collective oscillations when exposed to the incident light at the wavelength in the visible, infrared or ultraviolet spectrum, the plurality of nanoparticles of the metallic material including a plurality of nanoparticles of a non-spherical particle geometry, the plurality of nanoparticles of the metallic material being embedded in a structurally rigid transparent medium, wherein the non-spherical particle geometry includes at least one member of the group consisting of a geometry having a plurality of sharp protrusions on a spherical body, a geometry that includes at least one corner, and a mushroom-shaped geometry;

exposing the device to the incident light to thereby enhance a local electric field inside the surfaces of the plurality of nanoparticles of the non-spherical particle geometry to cause the plurality of nanoparticles of the non-spherical particle geometry to absorb the energy of the incident light above the threshold intensity and thereby at least substantially prevent transmission of the incident light above the threshold intensity through the device to the object; and exposing the device to incident light of an intensity not exceeding the threshold intensity, thereby at least substantially transmitting the incident light below the threshold intensity through the device to the object.

21. A method according to claim 20, wherein the method further comprises the steps of:

exposing the device to the incident light when the intensity of the incident light is below the threshold intensity, thereby at least substantially transmitting the incident light below the threshold intensity through the device to the object;

subsequently exposing the device to the incident light after the incident light transitions in intensity from below the threshold intensity to exceeding the threshold intensity, thereby at least substantially preventing transmission of the incident light above the threshold intensity through the device to the object for as long as the incident light exceeds the threshold intensity; and subsequently resuming exposing the device to the incident light after the incident light transitions in intensity from exceeding the threshold intensity to being below the threshold intensity, thereby resuming at least substantially transmitting the incident light below the threshold intensity through the device to the object.

22. A method according to claim 21, wherein the transmission of the incident light above the threshold intensity through the device to the object essentially ceases within a time of less than one nanosecond after the incident light transitions in intensity from below the threshold intensity to exceeding the threshold intensity.

23. A method according to claim 20, wherein the non-spherical particle geometry includes a geometry having a plurality of sharp protrusions on a spherical body.

24. A method according to claim 20, wherein the metallic material includes at least one material selected from the group consisting of gold, silver, aluminum, indium and copper.

25. A method according to claim 24, wherein the metallic material includes gold.

26. A method according to claim 24, wherein the metallic material includes silver.

27. A method according to claim 20, wherein the non-spherical geometry includes a geometry having a plurality of sharp protrusions on a spherical body and wherein the metallic material includes at least one material selected from the group consisting of gold, silver, aluminum, indium and copper.

28. A method according to claim 27, wherein the metallic material includes gold.

29. A method according to claim 27, wherein the metallic material includes silver.

30. A method according to claim 20, wherein each nanoparticle of the plurality of nanoparticles has a largest diameter in a range of between about 10 nanometers and about 200 nanometers.

31. A method according to claim 20, wherein the non-spherical particle geometry includes at least one corner.

32. A method according to claim 20, wherein the non-spherical particle geometry includes a mushroom-shaped geometry.

33. A method according to claim 20, wherein the device includes an alloy including at least one material selected from the group consisting of silver, gold, aluminum, indium and copper.

34. A method according to claim 20, wherein the transparent medium includes at least one material selected from the group consisting of a polymer and a glass.

35. A method according to claim 20, wherein the plurality of nanoparticles include at least two different types of nanoparticles.

36. A method according to claim 20, wherein the plurality of nanoparticles of the non-spherical particle geometry includes at least two different types of nanoparticles, and wherein the device includes a patterning of the at least two different types of nanoparticles.

37. A method according to claim 20, wherein the plurality of nanoparticles of the non-spherical particle geometry includes at least two different types of nanoparticles, and wherein the device includes a pixel array of the at least two different types of nanoparticles.

38. A method according to claim 20, wherein the threshold intensity is 0.5 $\mu J/cm^2$ or less for a pulse lasting one millisecond or less.

39. A method according to claim 20, wherein transmission of the incident light above the threshold intensity through the device to the object essentially ceases at any wavelength of incident light within at least a broadband range of the visible, infrared or ultraviolet spectrum.

40. A method according to claim 39, wherein the broadband range includes a range of incident light wavelengths that overlaps at least a portion of the range from 450 nm to 650 nm.

41. A method according to claim 20, wherein the object is selected from the group consisting of a human eye, a photosensitive device, a camera, a detector, a portion of a vehicle, a portion of an airborne system, a portion of an airplane, a portion of a helicopter, a portion of a space-borne system, a portion of a rocket, a portion of a missile, a portion of a telescope and a portion of a satellite.

42. A method according to claim 20, wherein the incident light includes light from a laser.

43. A method according to claim 20, further including, more than once, exposing the device to the incident light to thereby at least substantially prevent transmission of the incident light above the threshold intensity through the device to the object.

44. A method according to claim 20, wherein the transmission of the incident light above the threshold intensity through the device to the object is at least substantially reduced over at least a broad range of angles of incidence and over at least a broad range of polarizations of incident light.

45. An optical limiter device for protecting an object from incident light having a wavelength in the visible, infrared or ultraviolet spectrum, the device comprising:

a plurality of nanoparticles of a metallic material including free electrons that undergo collective oscillations when exposed to the incident light, the plurality of nanoparticles of the metallic material including a plurality of nanoparticles of a non-spherical particle geometry, wherein the non-spherical particle geometry has a geometry selected from the group consisting of a cube geometry, a pyramid geometry and a polyhedron geometry;

a structurally rigid transparent medium in which the plurality of nanoparticles of the metallic material are embedded; and a mechanical support mounting the transparent medium between the incident light and the object.

46. A method of protecting an object from incident light, the method comprising the steps of:

exposing a device, positioned between the incident light and the object, to incident light of a wavelength in the visible, infrared or ultraviolet spectrum and of an intensity exceeding a threshold intensity, thereby at least substantially preventing transmission of the incident light above the threshold intensity through the device to the object, the device including a plurality of nanoparticles of a metallic material including free electrons that undergo collective oscillations when exposed to the incident light at the wavelength in the visible, infrared or ultraviolet spectrum, the plurality of nanoparticles of the metallic material including a plurality of nanoparticles of a non-spherical particle geometry, the plurality of nanoparticles of the metallic material being embedded in a structurally rigid transparent medium, wherein the non-spherical particle geometry includes at least one geometry selected from the group consisting of a cube geometry, a pyramid geometry and a polyhedron geometry;

exposing the device to the incident light to thereby enhance a local electric field inside the surfaces of the plurality of nanoparticles of the non-spherical particle geometry to cause the plurality of nanoparticles of the non-spherical particle geometry to absorb the energy of the incident light above the threshold intensity and thereby at least substantially prevent transmission of the incident light above the threshold intensity through the device to the object; and exposing the device to incident light of an intensity not exceeding the threshold intensity, thereby at least substantially transmitting the incident light below the threshold intensity through the device to the object.

47. A method of protecting an object from incident light, the method comprising the steps of:

exposing a device, positioned between the incident light and the object, to incident light of a wavelength in the visible, infrared or ultraviolet spectrum and of an intensity exceeding a threshold intensity, thereby at least substantially preventing transmission of the incident light above the threshold intensity through the device to the object, the device including a plurality of nanoparticles of a metallic material including free electrons that undergo collective oscillations when exposed to the incident light at the wavelength in the visible, infrared or ultraviolet spectrum, the plurality of nanoparticles of the metallic material including a plurality of nanoparticles of a non-spherical particle geometry, the plurality of nanoparticles of the metallic material being embedded in a structurally rigid transparent medium, wherein the threshold intensity is $0.5 \, \mu J/cm^2$ or less for a pulse lasting one millisecond or less;

exposing the device to the incident light to thereby enhance a local electric field inside the surfaces of the plurality of nanoparticles of the non-spherical particle geometry to cause the plurality of nanoparticles of the non-spherical particle geometry to absorb the energy of the incident light above the threshold intensity and thereby at least substantially prevent transmission of the incident light above the threshold intensity through the device to the object; and exposing the device to incident light of an intensity not exceeding the threshold intensity, thereby at least substantially transmitting the incident light below the threshold intensity through the device to the object.

\* \* \* \* \*